United States Patent
Horng et al.

(10) Patent No.: US 7,401,319 B2
(45) Date of Patent: Jul. 15, 2008

(54) METHOD AND SYSTEM FOR RETICLE-WIDE HIERARCHY MANAGEMENT FOR REPRESENTATIONAL AND COMPUTATIONAL REUSE IN INTEGRATED CIRCUIT LAYOUT DESIGN

(75) Inventors: Chi-Song Horng, Palo Alto, CA (US); Devendra Joshi, San Jose, CA (US); Anwei Liu, Fremont, CA (US)

(73) Assignee: Invarium, Inc., San Jose, CA (US)

( * ) Notice: Subject to any disclaimer, the term of this patent is extended or adjusted under 35 U.S.C. 154(b) by 456 days.

(21) Appl. No.: 11/021,783

(22) Filed: Dec. 23, 2004

(65) Prior Publication Data
US 2006/0143589 A1    Jun. 29, 2006

(51) Int. Cl.
*G06F 17/50* (2006.01)
*G06F 19/00* (2006.01)
*G03F 1/00* (2006.01)
*G21K 5/00* (2006.01)

(52) U.S. Cl. ............... 716/21; 716/7; 716/17; 716/18; 700/120; 700/121; 430/5; 378/35; 250/492.22

(58) Field of Classification Search ............ 716/21, 716/7, 17, 18; 700/120, 121; 430/5; 378/35; 250/492.22
See application file for complete search history.

(56) References Cited

U.S. PATENT DOCUMENTS

| | | | |
|---|---|---|---|
| 5,528,508 A | 6/1996 | Russell et al. | |
| 5,731,986 A * | 3/1998 | Yang | ............ 716/19 |
| 6,249,904 B1 | 6/2001 | Cobb | |
| 6,370,679 B1 * | 4/2002 | Chang et al. | ........... 716/19 |
| 6,415,421 B2 | 7/2002 | Anderson et al. | |
| 6,453,452 B1 * | 9/2002 | Chang et al. | ............ 716/8 |
| 6,470,489 B1 * | 10/2002 | Chang et al. | ........... 716/21 |
| 6,505,327 B2 | 1/2003 | Lin | |
| 6,560,766 B2 | 5/2003 | Pierrat et al. | |
| 6,668,367 B2 | 12/2003 | Cobb et al. | |

(Continued)

FOREIGN PATENT DOCUMENTS

JP    2002245108 A  *  8/2002

OTHER PUBLICATIONS

U.S. Appl. No. 10/955,527, filed Sep. 30, 2004, Vishnu G. Kamat.

(Continued)

*Primary Examiner*—Phallaka Kik

(57) ABSTRACT

A hierarchical representation encapsulates the detailed internal composition of a sub-circuit using the notion of a cell definition (a CellDef). The CellDef serves as a natural unit for operational reuse. If the computation required for the analysis or manipulation (e.g. parasitic extraction, RET, design rule confirmation (DRC), or OPC) based on a CellDef or one cell instance can be applied, with no or minimal additional effort, to all or a significant subset of other instances of the cell, very substantial reduction in computational effort may be realized. Furthermore, a hierarchical representation also allows for the partitioning of the overall analysis/manipulation task into a collection of subtasks, e.g. one per CellDef. Multiple jobs may then be distributed across a large number of computational nodes on a network for concurrent execution. While this may not reduce the aggregate computational time, a major reduction in the overall turnaround time (TAT) is in itself extremely beneficial.

58 Claims, 21 Drawing Sheets

CellDef and CellInst with the Addition of the Environment Information

U.S. PATENT DOCUMENTS

| | | |
|---|---|---|
| 6,735,752 B2 | 5/2004 | Manoo |
| 6,738,958 B2 | 5/2004 | Manoo |
| 6,748,578 B2 | 6/2004 | Cobb |
| 2003/0018948 A1* | 1/2003 | Chang et al. ............... 716/8 |
| 2004/0060034 A1 | 3/2004 | Cote et al. |
| 2004/0083475 A1 | 4/2004 | Todd et al. |
| 2005/0277029 A1* | 12/2005 | Sasajima et al. ............ 430/4 |
| 2005/0278046 A1* | 12/2005 | Suttile et al. ............. 700/97 |
| 2006/0075379 A1* | 4/2006 | Kamat ..................... 716/21 |
| 2006/0218520 A1* | 9/2006 | Pierrat et al. ............. 716/19 |
| 2007/0099093 A1* | 5/2007 | Zhang et al. ............... 430/5 |

OTHER PUBLICATIONS

U.S. Appl. No. 10/933,192, filed Sep. 1, 2004, Devendra Joshi et al.

Kalus, Christian K. et al, "Generic hierarchical engine for mask data preparation," Proc. SPIE, vol. 4754, 2002, pp. 66-74.

* cited by examiner

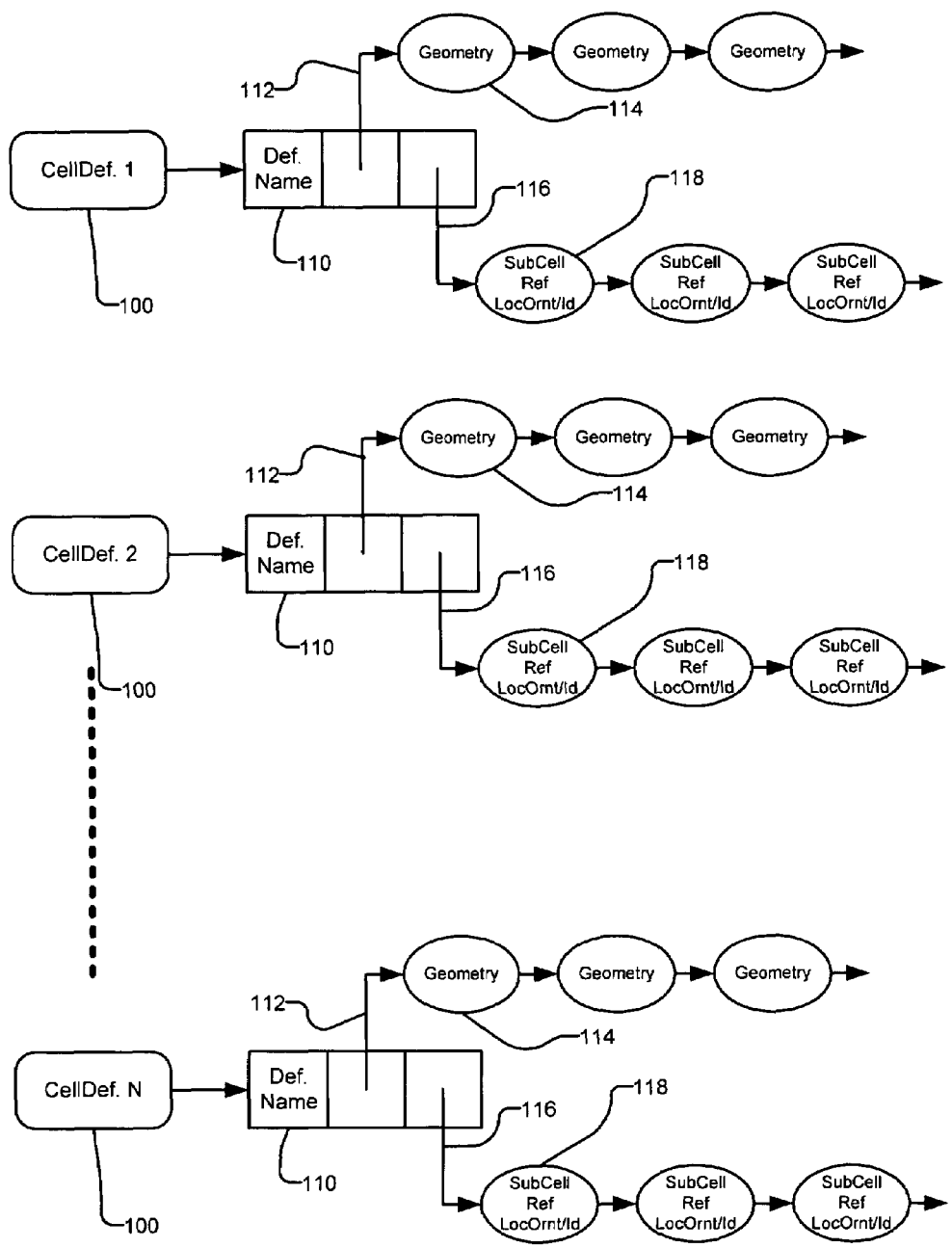
Fig. 1 Cell Definition (CellDef) Data Structures

CellDef ← —100        —110
CellDefName (a Cell Definition Name) ←

// zero or more geometric shapes/features. (These are shapes
// that are "drawn" locally within the cell definition (rather than
// being encapsulated within a further sub-cell) and are referred to
// as the inline or local geometries.)            —114
//
shape/polygon_1: sequence of vertices and other info ←
shape/polygon_2: sequence of vertices and other info
:
<other geometric shapes/features>
:

// zero or more cell references. These are CellDef's that are described
// in detail elsewhere.                —118-S
//
structure_reference_1  ←
    name of the defining CellDef
    reference name/ID
    placement location (relative to some origin of the "parent" CellDef,   possibly with some transformations,
        e.g., magnification, rotation,
            or mirroring)
structure_reference_2
    name of the defining CellDef
    reference name/ID
    placement location (relative to some origin of the "parent" CellDef,   possibly with some transformations,
        e.g., magnification, rotation,
            or mirroring)
:
:                        —118-A
array_reference_1  ←
    name of the defining CellDef
    reference name/ID
    placement location (relative to some origin of the "parent" CellDef)
    arraying parameters (# of rows, # of columns, row/column spacings,
        possibly with some transformations, e.g., magnification, rotation,
            or mirroring)
array_reference_2
    name of the defining CellDef
    reference name/ID
    placement location (relative to some origin of the "parent" CellDef)
    arraying parameters (# of rows, # of columns, row/column spacings,
        possibly with some transformations, e.g., magnification, rotation,
            or mirroring)
    :
    <other cell references>
    :
EndCellDef

Fig. 2

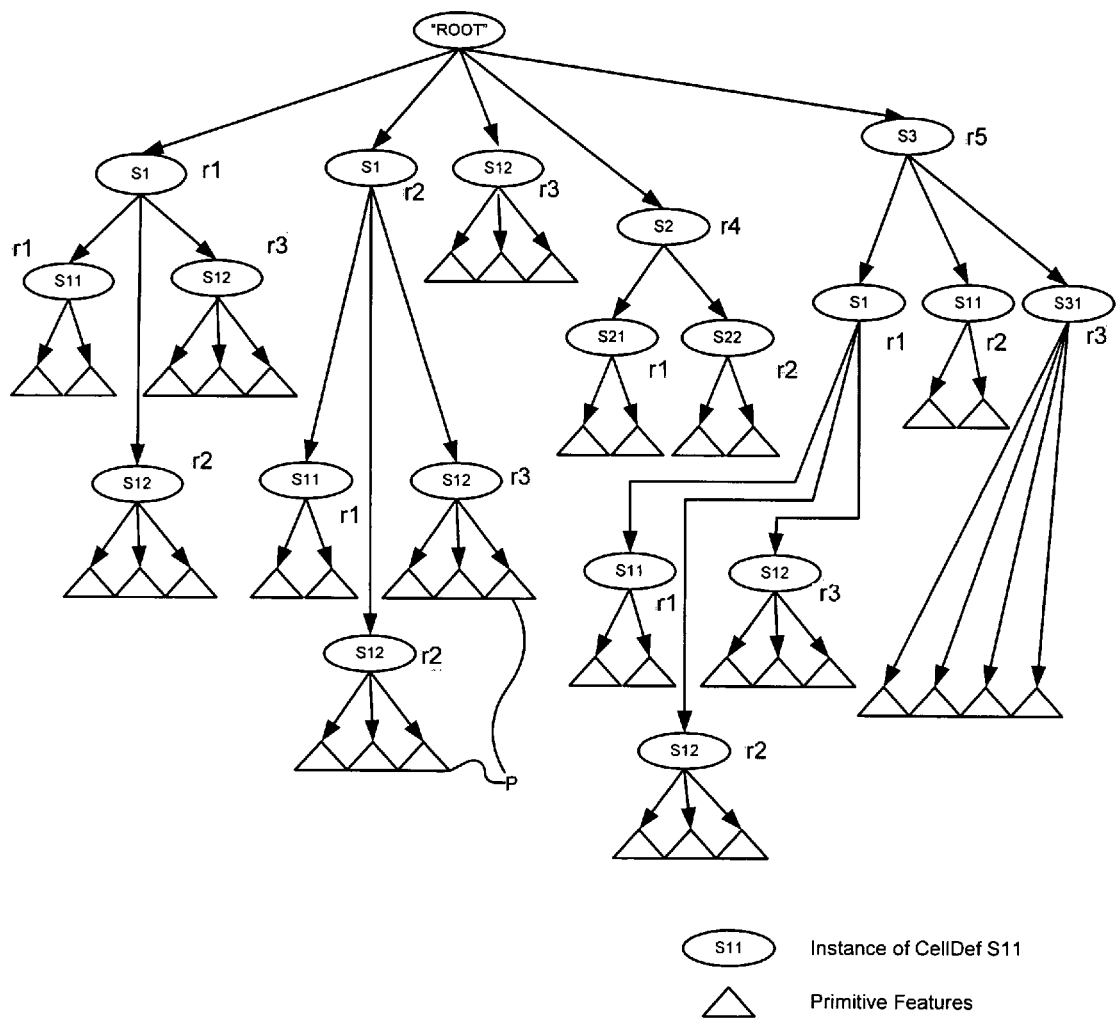
Fig. 3 A Cell Instance Hierarchy Tree

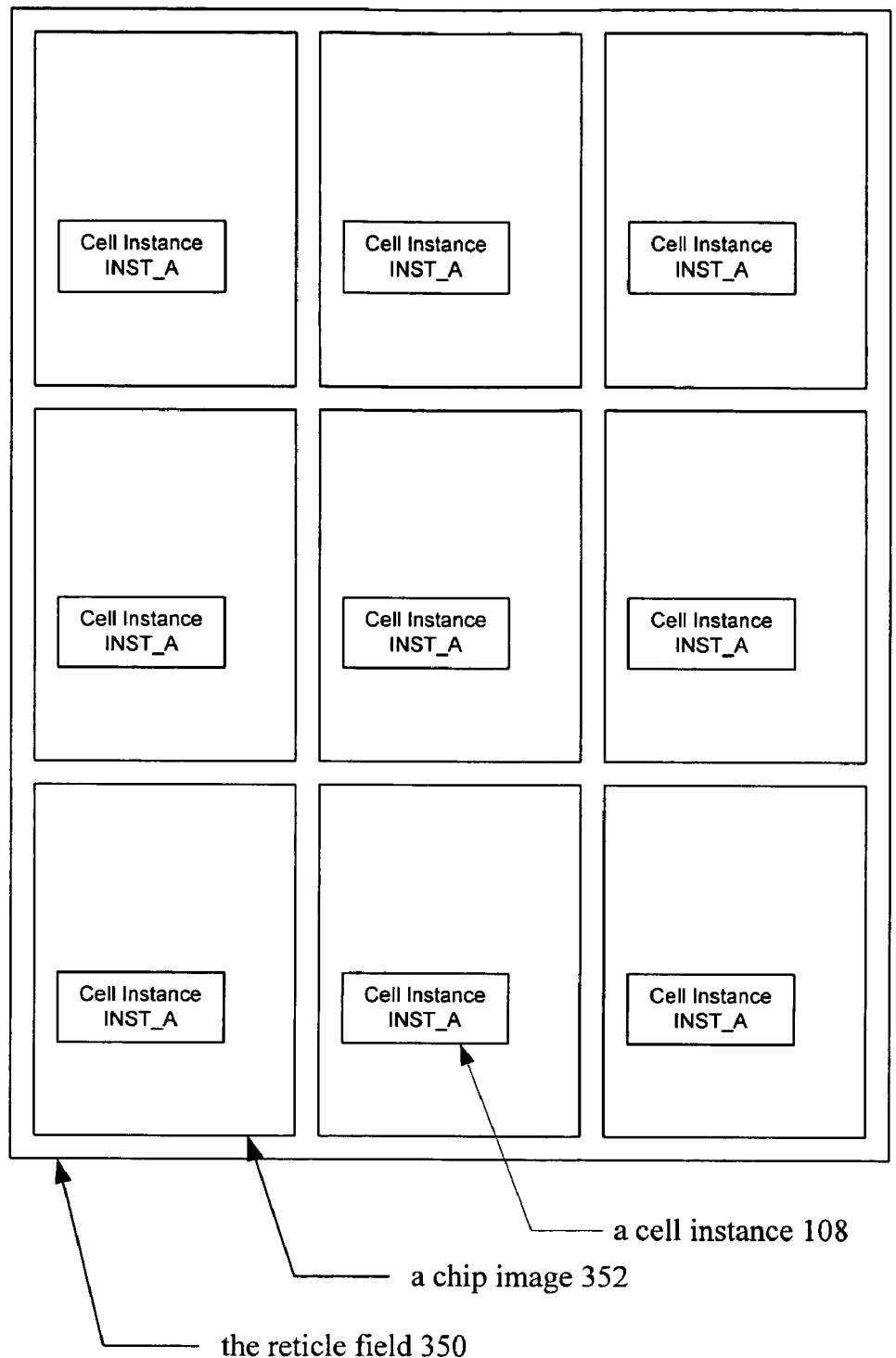
Fig. 4  A Reticle Field

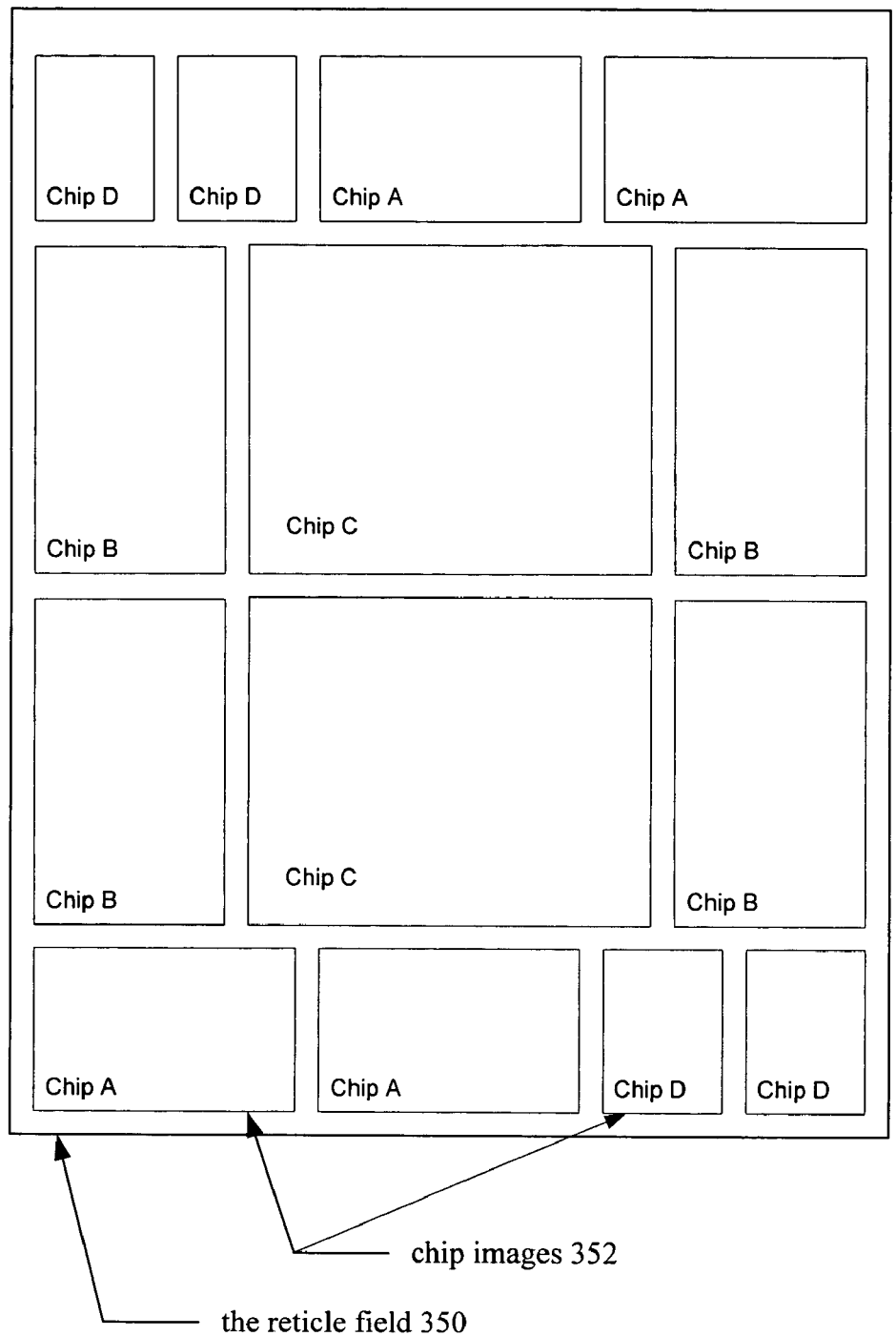
Fig. 5 A Reticle Field

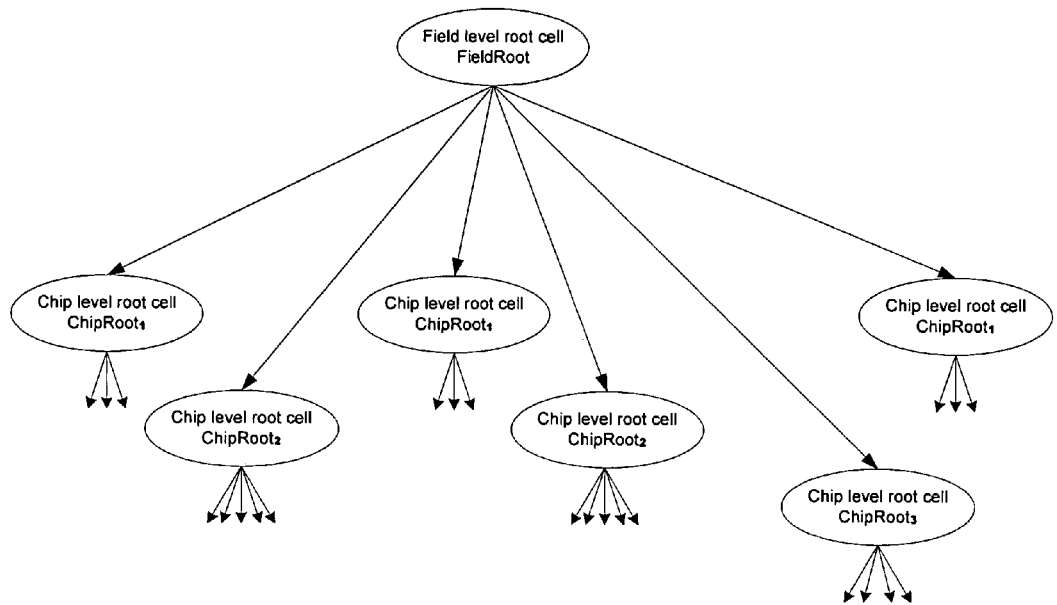
Fig. 6A Field level hierarchy tree for a reticle containing images of different chips
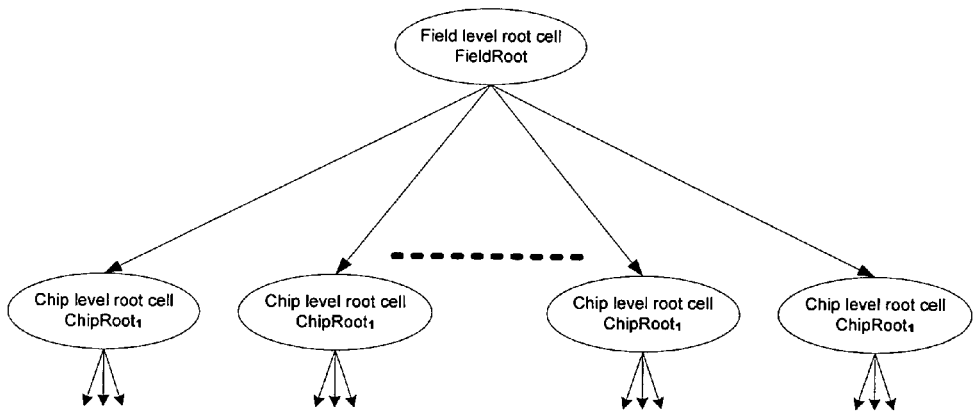
Fig. 6B Field level hierarchy tree for a reticle containing images of same chip

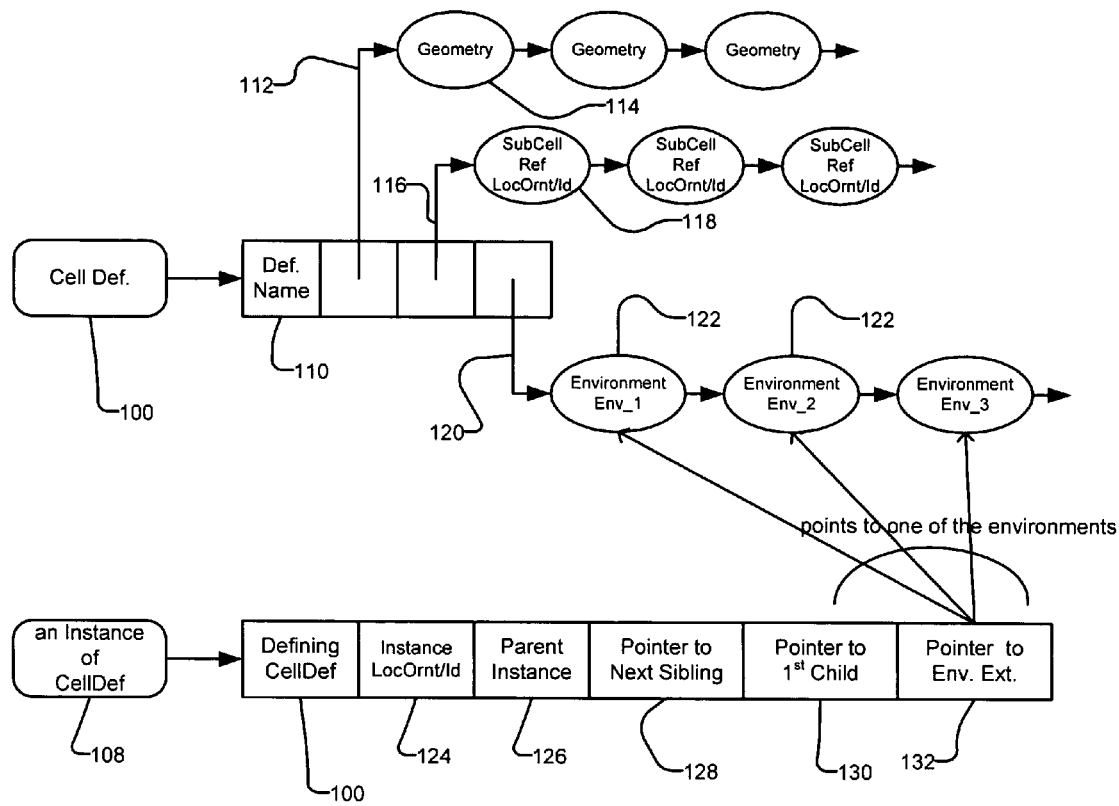
Fig. 7 CellDef and CellInst with the Addition of the Environment Information

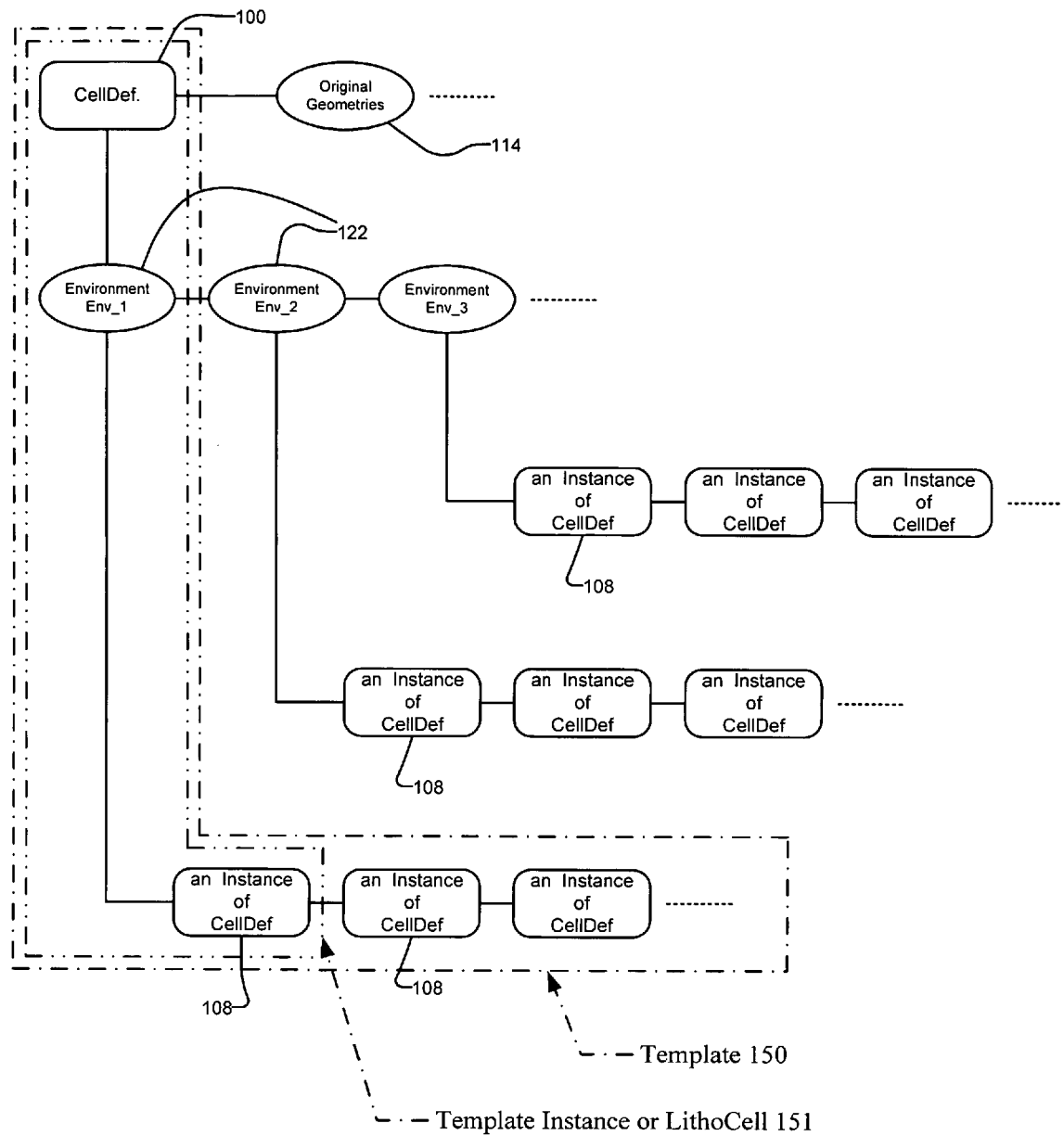
Fig. 8 Templates

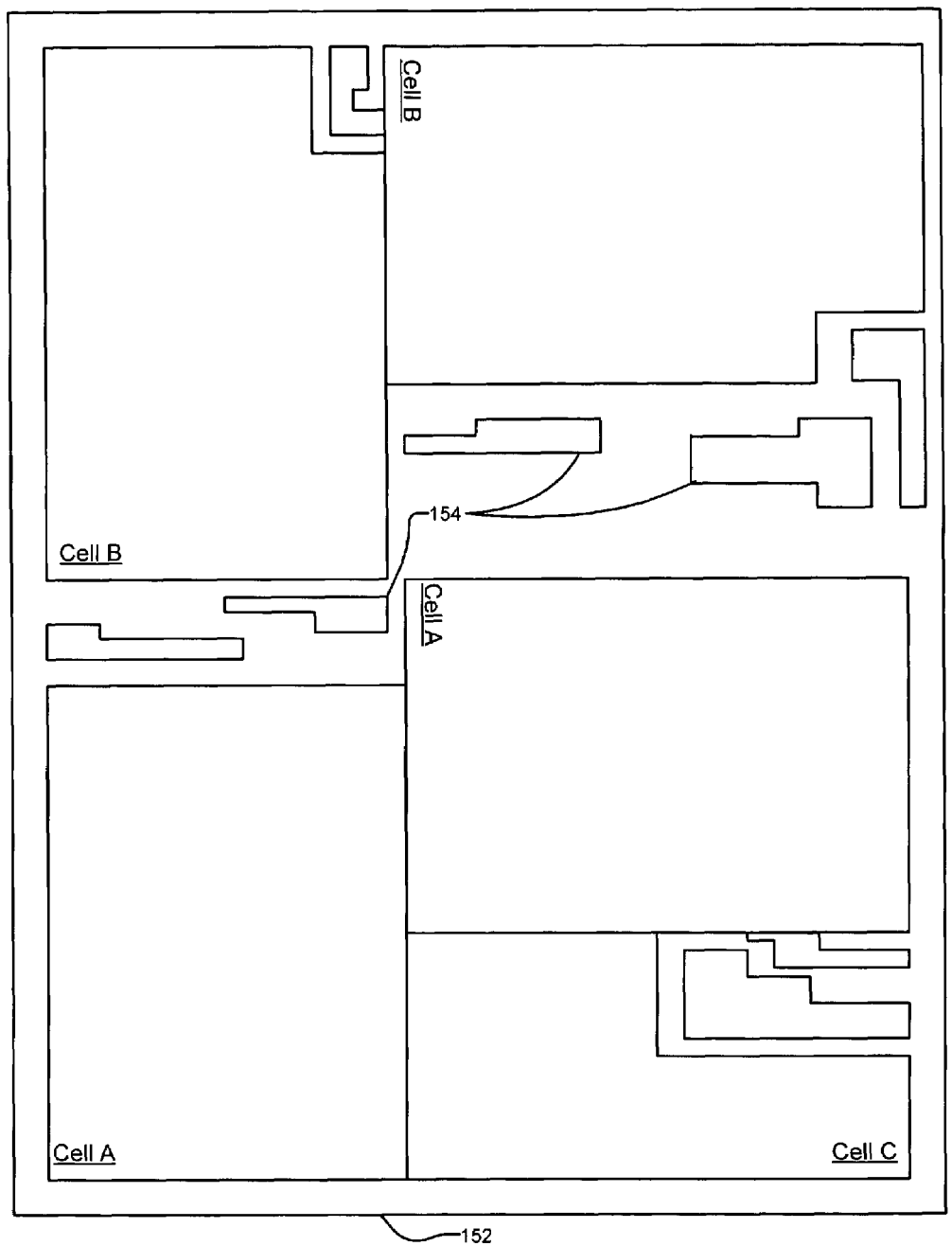
Fig. 9 A top-level chip layout containing five sub-cell instances and inline geometries

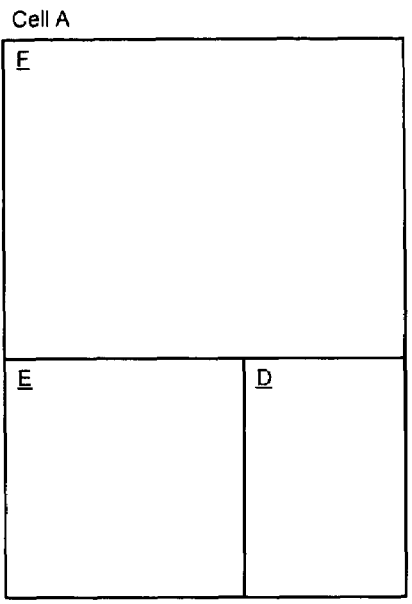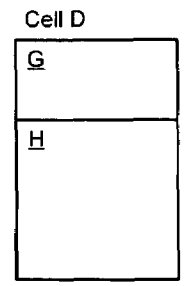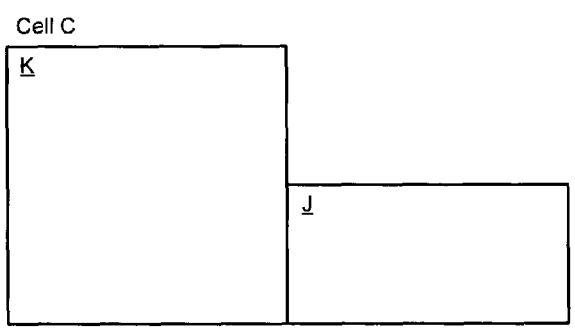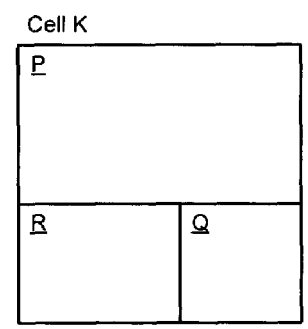
Fig. 10 Further sub-structures of Cell A and Cell C

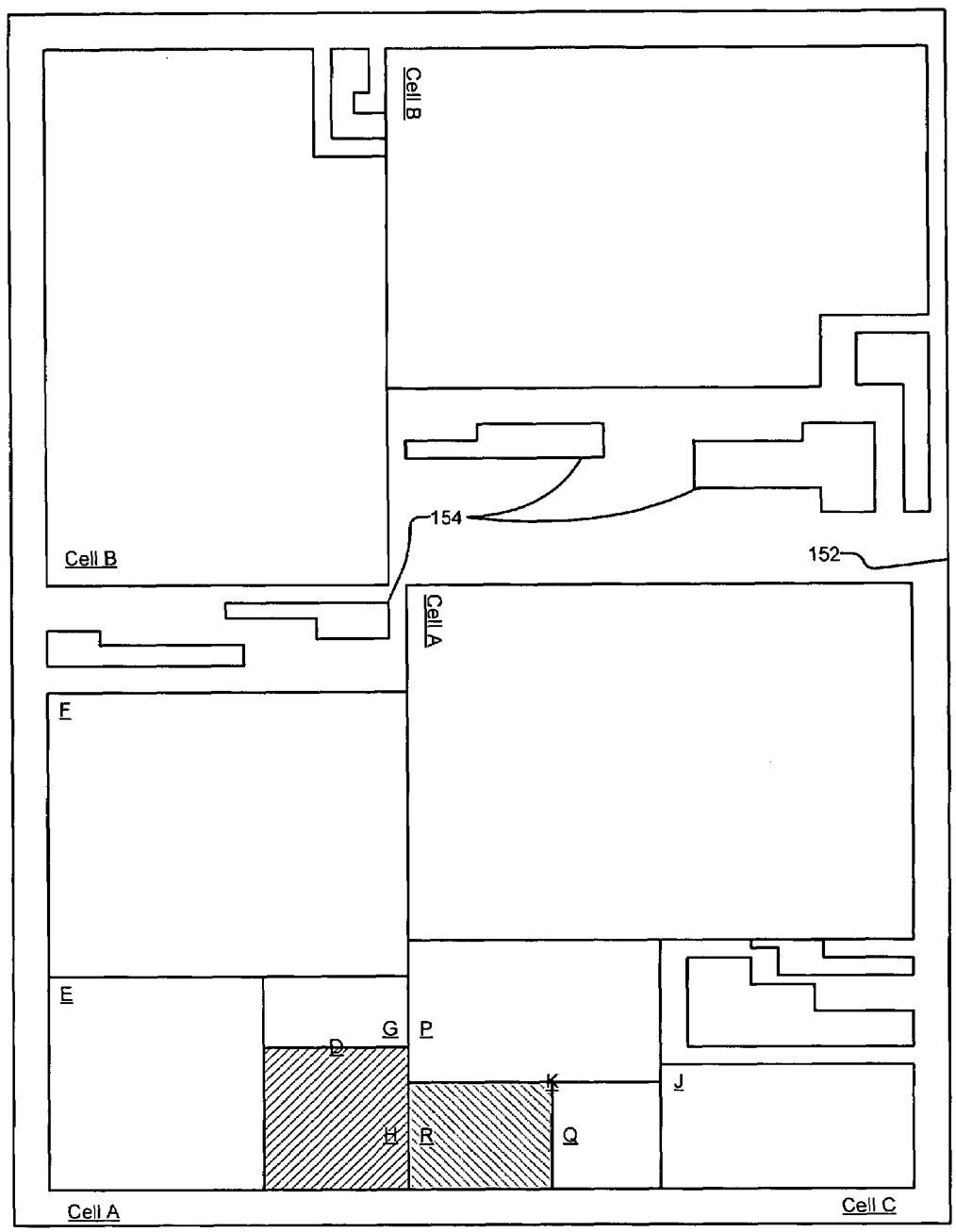
Fig. 11 Neighborhood relationship between cell instances H and R

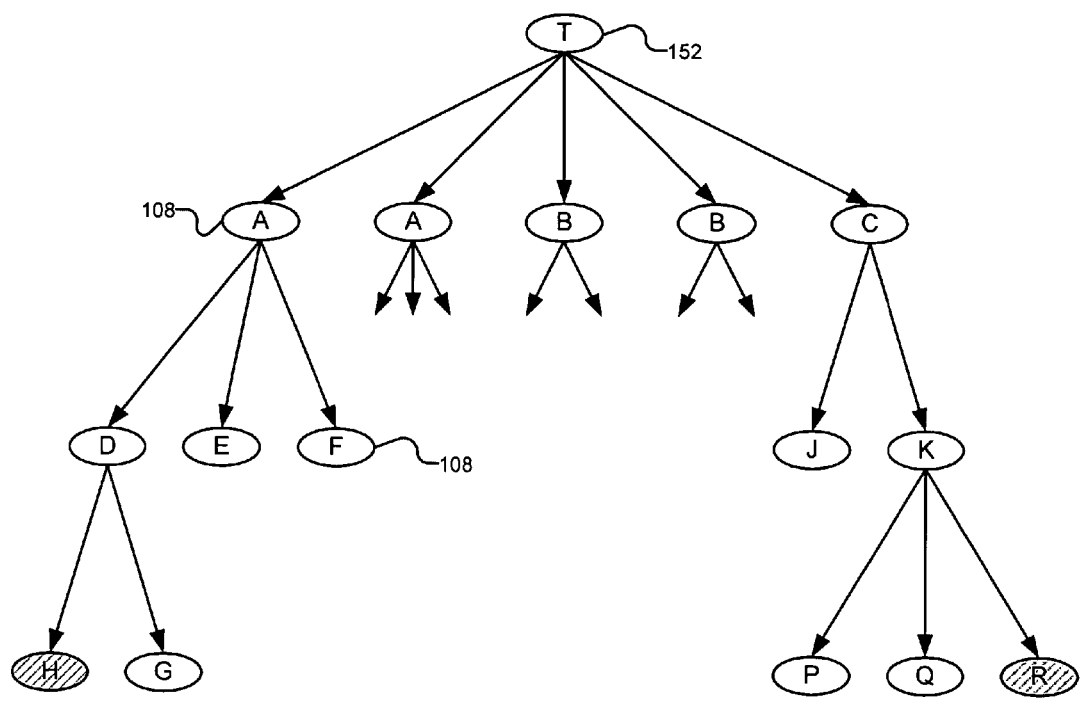
Fig. 12 Cell instance hierarchy tree

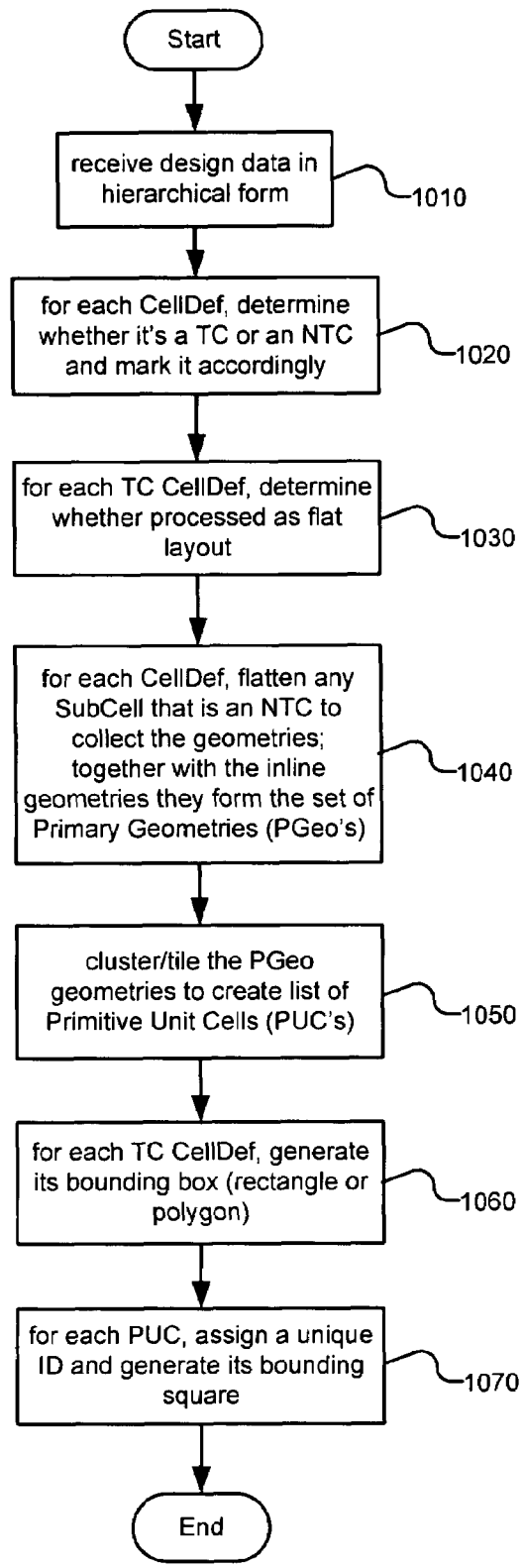
Fig. 13 Pre-Processing in Preparation for Template Generation

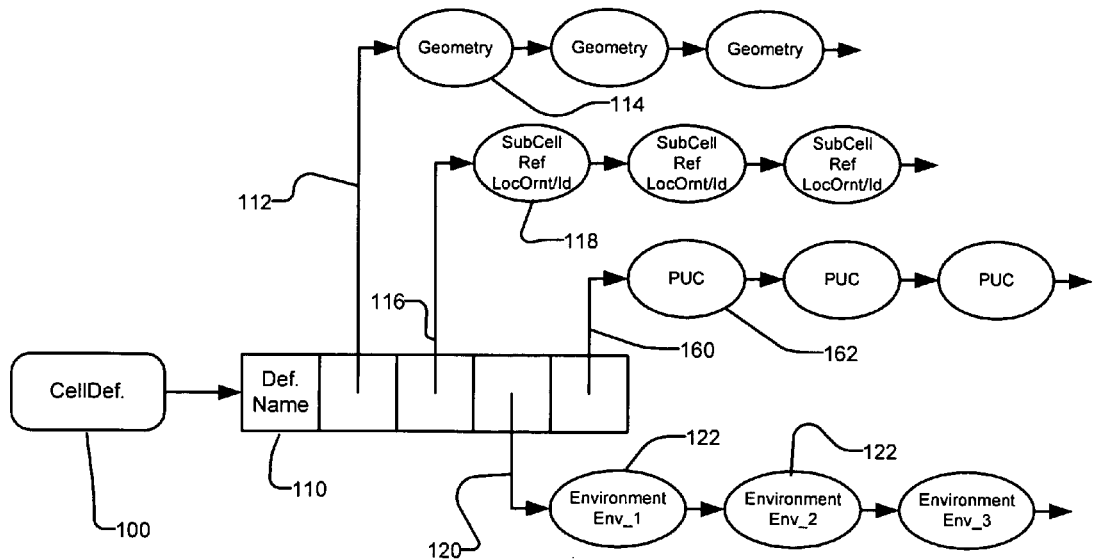
Fig. 14A  CellDef after the Addition of PUC's
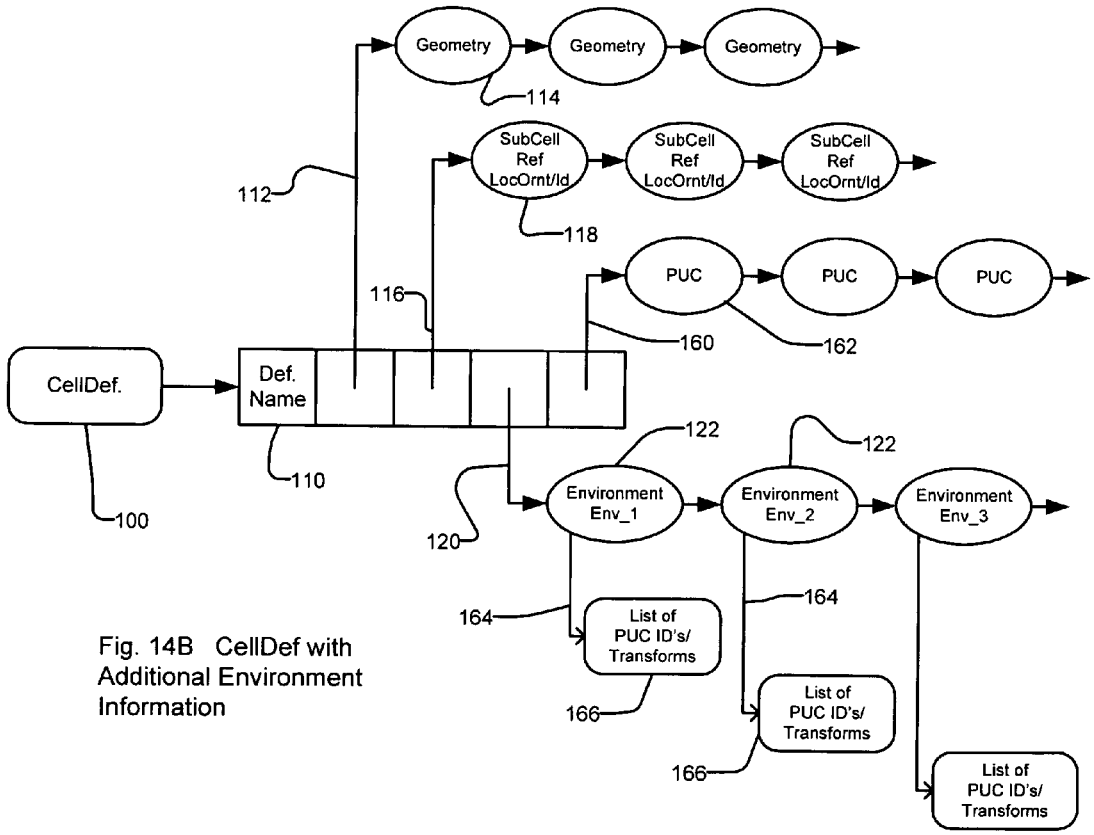
Fig. 14B  CellDef with Additional Environment Information

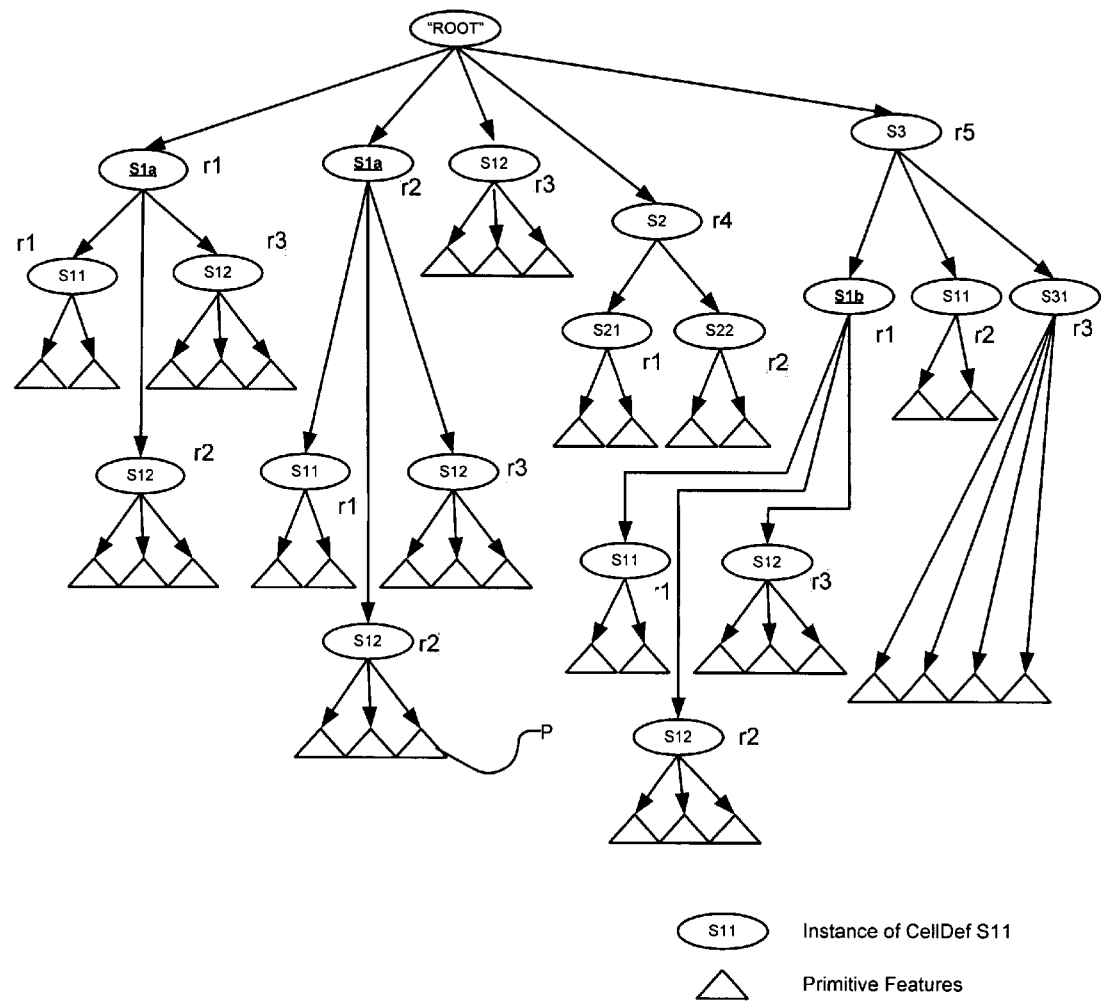
Fig. 15 Litho Tree for the Hierarchical Layout Shown in Fig. 3

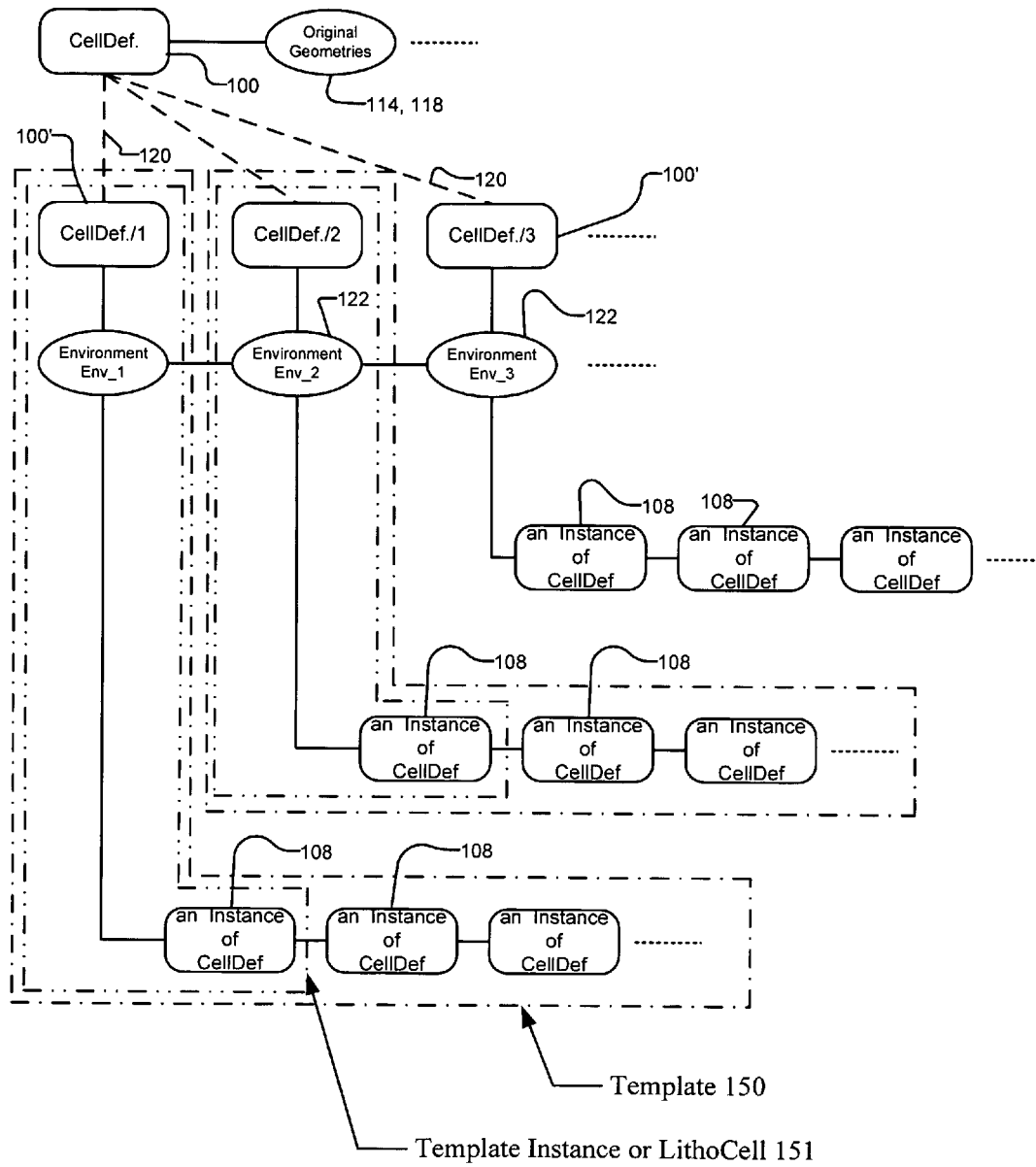
Fig. 16 New Cell Definitions and Templates

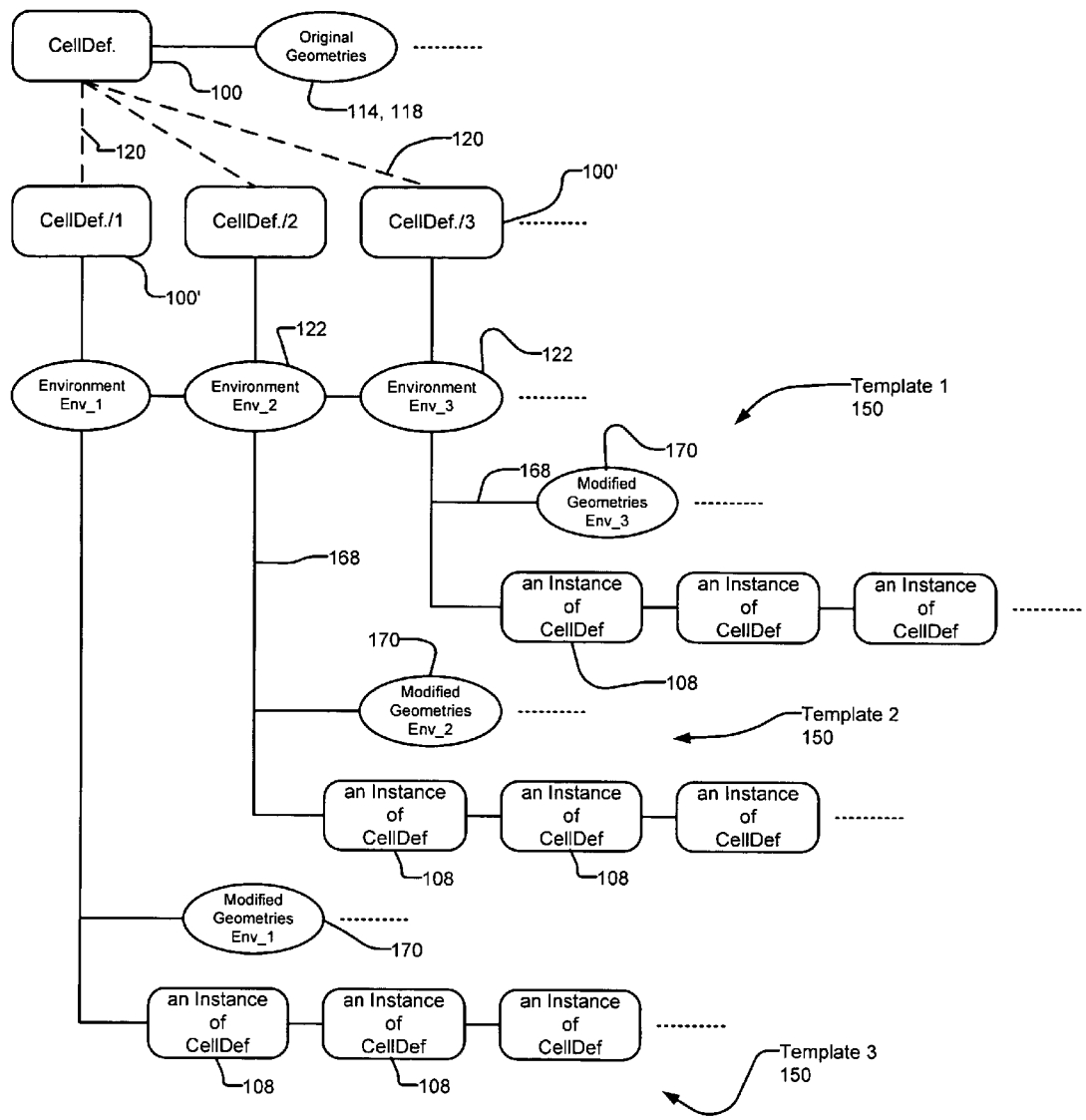
Fig. 17 Templates with Modified Geometries

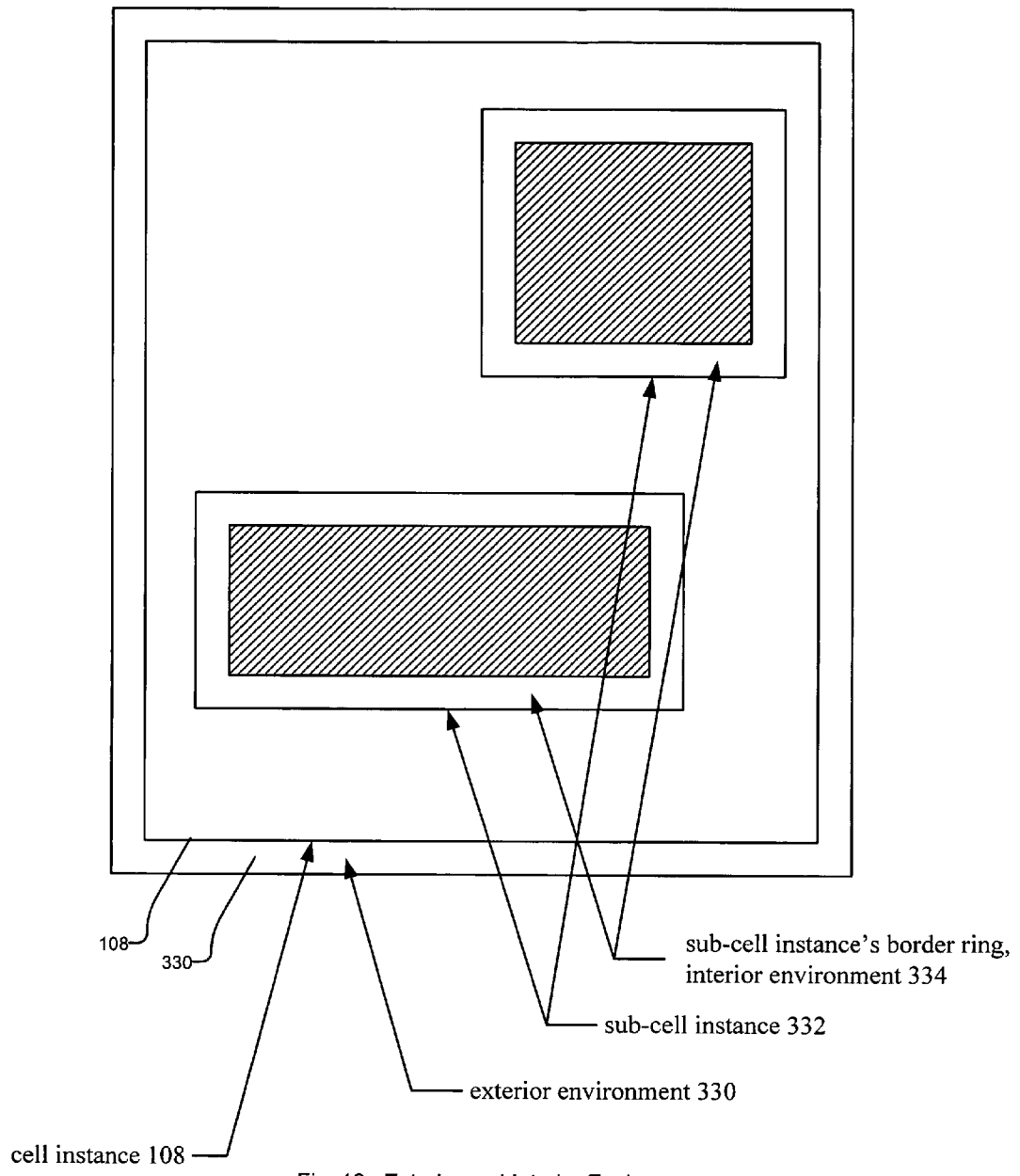
Fig. 18 Exterior and Interior Environments

Reticle field

Model zones

Model grids (a chip image)

Chip images across reticle field

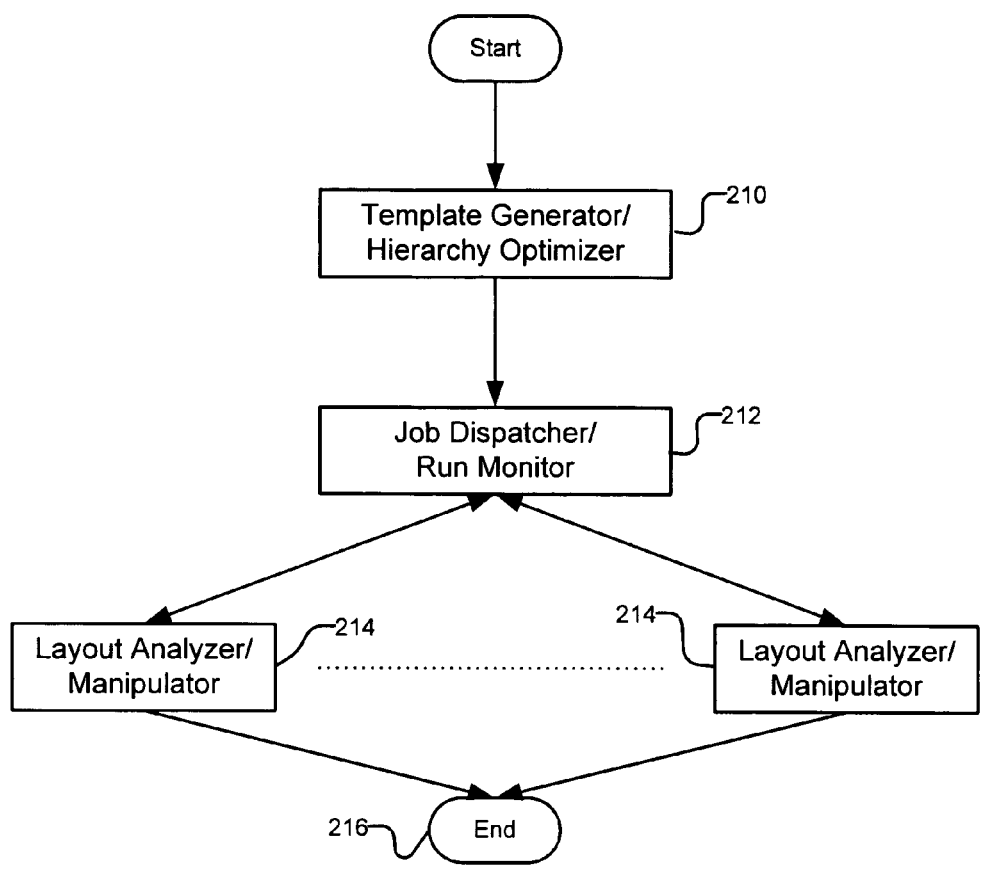
Fig. 20B  Basic Flow of an Example Distributed Application

METHOD AND SYSTEM FOR RETICLE-WIDE HIERARCHY MANAGEMENT FOR REPRESENTATIONAL AND COMPUTATIONAL REUSE IN INTEGRATED CIRCUIT LAYOUT DESIGN

BACKGROUND OF THE INVENTION

The process of designing integrated circuits typically involves a functional design step, followed by a physical design step. During the functional design step, a design concept is described using a hardware description language and is then converted into a netlist, which specifies the electronic components and the connections between the components. The physical design step specifies the placement of the electronic components or elements on the chip and routing of the connections between the electronic components, thereby implementing the netlist. The physical design process generates the physical design data, which are synonymously called layout data, layout, or target layout.

The layout data defines a set of binary patterns or objects, which are also called "geometric features" or "features". Usually the objects are represented as a polygon or collection of polygons in the layout data in order to facilitate the specification of the objects.

Each object can be a part of an electronic component such as a gate of a transistor or a connection between components. Each polygon object has vertices and edges joining those vertices. Each vertex is usually defined by its coordinates in a Cartesian x-y coordinate system. In a typical very-large scale integrated (VLSI) circuit, most edges are parallel to the x or y axis, in a so-called Manhattan layout style.

Often the physical layout data are stored and transmitted in a machine-readable format such as GDSII format, OASIS™ format, or in a database such as OpenAccess database or Milkyway™ design database. See, for example, *OpenAccess: The Standard API for Rapid EDA Tool Integration*, ©2004 by Si2, Inc.; *Milkyway Foundation Database for Nanometer Design*, ©2003 by Synopsys, Inc.

In these formats or databases, the layouts are often described hierarchically. This has the advantage of reducing file sizes and improving efficiency for certain analysis or modification operations, since some repetitive patterns can be given certain unique names and then placed multiple times in the layout by simply referring to those names. Repeatedly describing or performing computations for the same structure in detail can thus be avoided.

In a hierarchical layout description, a cell is a collection of layout features that can be referenced as a whole object. Thus, cells can be included in the layout by reference. Inclusions by reference can further be nested.

Figuratively, the hierarchy of the layout resembles a tree. The leaves of a tree are attached to its branches. Branches are attached to larger branches. The hierarchy of branches continues until the trunk of the tree reaches its root. "Leaf cells" of a layout are cells that do not include any other cells by reference. A leaf cell comprises a set of primitive objects or features, which are usually polygons. A "child cell" is included in its "parent cell." A "root cell" is not included in any other. A layout can have multiple root cells, resembling a forest with multiple trees. And cells can be referenced any number of times within a single parent cell or by multiple parent cells.

Cell references can take one of two forms: a Structure Reference (SREF) or an Array Reference (AREF). A structure reference places an instance (a copy) of a cell at a particular (x,y)-offset within a parent cell. Each instance has some transformation information, which can often include translation, magnification, reflection, and/or rotation. An array reference describes multiple instances of a cell that are placed on a set of locations that form a regular grid or array. The array is defined by: 1) a number of rows; 2) a number of columns, 3) row and column spacings, 4) (x, y) offset of an instance; and 5) a set of magnification, reflection, and rotation that are common to all cells in the array.

If a layout does not have hierarchy, it is called flat. A layout can be flat as per design. Sometimes a hierarchical layout can be flattened. "Flattening a layout" means removing its hierarchical organization by replacing each cell reference by the set of geometric features contained in the cell that is referenced.

Semiconductor device manufacturing comprises many steps of patterning layers of silicon wafers according to the layout data. A layer is either the substrate of the semiconductor wafer or a film deposited on the wafer. At some steps, a pattern is etched into a layer. At some other steps, ions are implanted, usually in a pattern, into the layer. Generally, patterning comprises: lithographic exposure, resist development, and resist etching.

The prevalent form of lithography is optical projection lithography. This involves first making a mask or reticle that embodies the pattern to be projected onto the wafer. An image of the mask's pattern is then optically projected onto a photoresist film coated on the wafer. This selectively exposes the photoresist. The latent image is then developed, thereby making a stencil on the wafer.

Presently, the most common optical lithography projectors are stepper-scanners. These instruments expose a slit shaped region, which is often 26 millimeters (mm)×8 mm on the wafer. The wafer is scanned under the slit by a motorized stage under interferometer control. The mask is scanned in synchronization with the wafer but at a higher speed to account for the reduction of the projector (typically 4×). One scan typically exposes a 26 mm×33 mm image field. Step-and-repeat lithography projectors expose the wafer a field at a time. A common field size here is 22 mm×22 mm. In either case, many exposure fields are needed to cover the wafer.

Other forms of lithography include mask-less optical projection lithography, where the mask is replaced by a spatial light modulator. The spatial modulator is typically an array of micro-machined mirrors that are illuminated and imaged onto the wafer. The spatial light modulator is driven by the lithography data. Direct electron-beam writing lithography, electron projection lithography, and imprint lithography are other forms of lithography.

Modern semiconductor lithography processes often print features that are smaller than the exposure wavelength. In this regime, called the low-$k_1$ regime, the field and wave nature of light is prevalent, and the finite aperture of the projection lens acts as a low-pass filter of spatial frequencies in the image. Thus, it may be difficult for the projection lens to reproduce the high spatial frequency components required to reproduce the sharp edges or corners in polygon objects, for example. Also, light entering a mask opening from one object may impact another shape in close proximity, leading to a complex interaction of the electric fields of adjacent objects. Thus, the final shapes that are produced on the wafer will often have rounded corners and may bulge towards adjacent objects in ways that can impact the process yield. This resulting image distortion, called optical proximity effect, is responsible for the most significant distortion that arises in the transfer of the mask pattern onto the wafer.

Optical Proximity Correction (OPC) is the process of changing, or pre-distorting, the target layout data to produce the lithography or mask data so that the pattern that is etched in the wafer is a closer replica of the target layout. The goal of OPC is to counter the distortions caused by the physical patterning process (see A. K-T Wong, Resolution enhancement techniques in optical lithography, SPIE Press, Vol. TT47, Bellingham, Wash., 2001; H. J. Levinson, Principles of Lithography, SPIE Press, Bellingham, Wash., 2001). In effect, the objects or polygons of the lithography data are modifications from those specified by the target layout in an effort to improve the reproduction fidelity of the critical geometric features. This is often accomplished by moving object edges and by adding additional objects to the layout to counter optical and process distortions. These corrections are required to ensure the intended target design pattern fidelity is met, improving the process window and consequently manufacturing yield.

Application of many resolution enhancement technologies (RET) can also have the effect of changing the layout data relative to the lithography data. RET also addresses distortion in the lithography process by pre-compensation. Typically, RET involves implementing a resolution enhancement technique such as the insertion of sub-resolution assist features (SRAF), phase shift enhancement using an attenuated phase mask, or designing a mask that includes quartz etching to introduce phase shifting across features.

Still further, functional requirements can lead to changes when migrating from the layout data to the lithography data. For example, electronic elements, including conductive traces and transistors, that lie on critical paths may be more aggressively modified to improve yields, possibly at the expense of other, lower priority paths.

In short, the target layout describes the pattern that the designer desires to render on the wafer to form the integrated circuit. It is usually different than the pattern that is actually rendered on the integrated circuit, and is therefore usually very different than the pattern submitted to the mask making process due to implementations of RET and OPC. Thus, the target layout, the lithography or mask data, and the pattern resulting on the wafer are typically distinct patterns.

Different techniques are used to simulate the transformation between the mask pattern and the pattern that is formed in the photo resist. The process for generating the OPC, RET, and other compensations for a given object or mask is typically an iterative process involving moving parts of or adding to the objects, and determining if the new objects result in a better resist pattern. In model-based OPC or RET, various process effects are simulated. Model-based OPC, for example, is a numerically intensive calculation that transforms the target layout into mask data.

SUMMARY OF THE INVENTION

One of the primary objectives of hierarchy management is to maximize reuse, in both representation and computation. A hierarchical representation encapsulates the detailed internal composition of a sub-circuit using the notion of a cell definition (a CellDef). The cell definition is then used or referred to in other cell definitions, possibly many times. Without having to repeat the detailed composition of the cell, a reference to the CellDef requires a minimal amount of information. Very significant savings in representational data volume can thus be accomplished.

A given CellDef can also serve as a natural unit for operational reuse. If the computation required for the analysis or manipulation (e.g. parasitic extraction, positional perturbations, RET, design rule checking (DRC), or OPC) based on a CellDef or one cell instance can be applied, with no or minimal additional effort, to all or a significant subset of other instances of the CellDef, very substantial reductions in computational effort may be realized. Furthermore, a hierarchical representation also allows for the partitioning of the overall analysis/manipulation task into a collection of subtasks, e.g one per CellDef. Multiple jobs may then be distributed across a large number of computational nodes on a network for concurrent execution. While this may not reduce the aggregate computational time, a major reduction in the overall turnaround time (TAT) is in itself extremely beneficial.

Evolving applications lead to new requirements on hierarchy management. For example, while conventional OPC techniques address some of the higher order distortions that occur between the layout pattern and the pattern formed in the photo-resist due to proximity effects, they fail to take into account distortions caused by other factors, such as position of the features in the reticle field or structural functionality requirements of the electrical components. A need exists to take into account such other factors, as well as the proximity effects, when managing a layout hierarchy. Collectively we call these applications layout optimization applications.

Moreover, a need exists to manage layout hierarchies on a scale larger than the extent of a single chip, for example, in order to take into account positional distortion effects across the entire reticle field.

Still further, a need exists to efficiently manage a hierarchy by making appropriate trade-offs between hierarchy management speed against compactness of the hierarchical representation.

One aspect of the present invention is directed to techniques for facilitating the preservation of the hierarchical organization that is common to layout data in the transition to the lithography data, which comprehends the required analysis or manipulation.

Another aspect of the invention is directed to extending the hierarchical organization across the entire reticle field. This allows for the specification of templates that extend over the entire field. Moreover, compensation for positional perturbations having field level extent can now be included, organically, in the lithography data.

In yet another aspect, the invention is directed to the distribution of the computational task for an integrated circuit layout design on a reticle field wide basis among a collection of networked computation nodes. This enables better concurrent execution, lowering turn around time.

In general, according to one aspect, the invention features a method for reticle field-wide hierarchy management. This method comprises providing placement information for a hierarchical chip layout across a reticle field and generating templates across that reticle field in accordance with the placement information.

In this way, the templates need no longer be limited to the level of the chip. Instead, the same templates can now be extended to span the entire reticle field.

One advantage is that corrections for positional effects or perturbations such as generated by the imperfections in the optics of the lithography system, which extend across the reticle, can now be included within the hierarchy of the lithography data.

In some examples, the step of providing placement information comprises providing locations for instances of the chip layout as array references across the reticle field. In other examples, coordinates are provided for the instances of the chip layout to thereby enable arbitrary placement of the instances in the reticle field.

In the typical example, a reticle field-level cell is defined that encompasses at least one chip level cell corresponding to the chip layout. This reticle field-level cell is often the root cell.

In a preferred embodiment, the step of generating the templates in accordance with the placement information comprises generating templates by grouping instances according to distinct environments. The environments are distinguished by proximity unit cells in regions adjacent to each of the instances. In other examples, the instances are distinguished by functional requirements or positional effects pertaining to each of the instances. These positional effects include lens aberration, optical flares and/or pupil illumination non-uniformity.

In another preferred embodiment, the step of generating the templates in accordance with the placement information comprises first grouping instances subject to common proximity perturbation effects and then further grouping the instances to address positional perturbation effects.

In general, according to another aspect, the invention also features a method of reticle field-wide hierarchy management in an integrated circuit chip layout design. This method comprises first receiving a chip layout in a hierarchical form. Then placement information for the chip layout is provided, locating the chip in the reticle field. Finally, templates are generated to thereby build a litho hierarchy tree for the entire reticle field in accordance with the placement information.

In a preferred embodiment, the step of generating the templates and building the litho hierarchy tree comprises, for each instance of a template candidate cell definition, determining an exterior environment. Then, amongst the exterior environments of the instances, a set of distinct environments is identified. The collection of instances is partitioned to create one or more templates in accordance with their respective environments.

In general, according to another aspect, the invention features a method of partitioning a plurality of instances of a template candidate cell in a hierarchical chip layout design. This method comprises identifying adjacent regions of each of the instances of the template candidate cell. Proximity environment definitions are generated for each of the instances of the template candidate cell. The proximity environment definitions comprise one or more proximity unit cells that overlap or are in contact with the adjacent regions of each of the instances. From this, a set of distinct environments is determined from the proximity environment definitions. Then instances of the template candidate are assigned to corresponding ones of the distinct environments based on the proximity unit cells information.

In a preferred embodiment, a pre-processing step creates clusters of primitive geometries into primitive unit cells, and provides each such cell with a unique numerical identifier. In the operation of trying to determine the identity of proximity environments, computational time is reduced by using these numerical identifiers, rather than by comparing elements of the primitive geometries in the adjacent regions of each instance.

Templates are defined for each CellDef containing subsets of the instances of the cell based on unique exterior environments. These templates can then be used as the units of distributed processing among a collection of networked computation nodes. The computation nodes perform the intended computations for the templates, preferably concurrently. In layout optimization applications, these computations include determining optical proximity corrections, corrections to address positional effects or perturbations, and/or possibly corrections to address functional requirements for those instances.

In general, according to another aspect, the invention features a method for distributing a computational task for an integrated circuit layout design on a reticle field-wide basis among a collection of networked computational nodes. The method comprises generating a plurality of templates and building a litho hierarchy tree across the entire reticle field in accordance with the placement information for the chip layout across the reticle field. Then, the computation tasks are assigned to the networked computational nodes for concurrent execution. Finally, the outputs of the computational nodes are assembled.

Typically, the process of assembling the outputs comprises creating a final processed circuit layout for the entire reticle field.

In general, according to another aspect, the invention features a computer software product for reticle field-wide hierarchy management. This product comprises a computer readable medium in which program instructions are stored. These instructions, when read by a computer, cause the computer to receive placement information for a hierarchical chip layout across a reticle field. Additionally, the instructions cause the computer to generate templates across the reticle field in accordance with the placement information.

In general, according to another aspect, the invention features a computer software product for reticle field-wide hierarchy management in an integrated circuit chip layout design. This product comprises a computer readable medium in which program instructions are stored. These instructions, when read by a computer, cause the computer to receive a chip layout in a hierarchical form, in addition to receiving placement information for the chip layout across the reticle field. The computer generates templates and then builds a litho hierarchy tree across the entire reticle field in accordance with the placement information.

In general, according to still another aspect, the invention features a computer software product for partitioning a plurality of instances of a template candidate cell in a hierarchical chip layout design. The product comprises a computer readable medium in which program instructions are stored. These instructions, when read by the computer, cause the computer to identify adjacent regions for each of the instances of the template candidate cell and generate proximity environment definitions for each of the instances of the template candidate. The proximity environment definitions comprise one or more primitive unit cells overlapping or in contact with adjacent regions of each of the instances. A set of unique environments is determined from the proximity environment definitions and the instances of the template candidate cell are assigned to a corresponding one of the unique environments based on the primitive unit cells.

In general, according to another aspect, the invention features a computer software product for distributing a computational task for an integrated circuit layout design on a reticle field-wide basis among a collection of networked computational nodes. The product comprises a computer readable medium in which program instructions are stored. These instructions, when read by a computer, cause the computer to generate a plurality of templates and build a litho hierarchy tree across the reticle field in accordance with placement information for the chip layout across the reticle field. The computational tasks for the templates are assigned to the networked computational nodes for concurrent execution. The outputs of the computational nodes are then assembled.

In general, according to another aspect, the invention features a mask fabricated using lithography data created using the reticle field-wide hierarchy management. Placement information for a hierarchical chip layout is provided across a reticle field and templates were generated across the reticle field in accordance with the placement information.

According to still other aspects, the invention features an integrated circuit manufactured according to the previous specified methods, or software products. Further, the invention also features integrated circuits manufactured with the layout data specified above.

The various aspects of the invention can be used separately or in combination.

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1 is a schematic diagram showing the contents of the cell definition data structures according to an aspect of the present invention;

FIG. 2 shows further details of the cell definition data structure in a textual form;

FIG. 3 is a schematic diagram showing the cell instance Hierarchy Tree for a chip, as yet unmodified from a GDS input;

FIGS. 4 and 5 illustrate reticle fields, with chip images placed in the fields and further cell instances placed within those chip images;

FIGS. 6A and 6B illustrate the reticle field level Hierarchy Tree view for two reticle layouts;

FIG. 7 is a schematic diagram of the cell definition data structure, including an instance of the cell definition according to an aspect of the present invention;

FIG. 8 is a schematic diagram illustrating a cell definition, including the proximity environments and the associated cell instances, and also showing the formation of a template, a template instance or LithoCell;

FIG. 9 illustrates a top level chip layout containing five sub-cells and some inline geometries;

FIG. 10 illustrates further sub-cells in the exemplary cells A and C;

FIG. 11 shows the spatial arrangements of cell instances to illustrate the neighborhood relationship between such cell instances;

FIG. 12 is a schematic diagram illustrating a partial hierarchical tree view for the example layout shown in FIGS. 9-11;

FIG. 13 is a flow diagram illustrating the pre-processing performed on the layout data in preparation for template generation according to an aspect of the present invention;

FIG. 14A illustrates the CellDef structure with the addition of the primitive unit cell (PUC) information.

FIG. 14B illustrates the revised cell definition in which the proximity environments are defined using the PUC information;

FIG. 15 is a schematic diagram illustrating a Litho Hierarchy Tree according to an aspect of the present invention;

FIG. 16 illustrates the cell definition data structure after the creation of new cell definitions as a result of template generation.

FIG. 17 illustrates the cell definition data structure and associated templates, including the modified geometries after some layout manipulation application;

FIG. 18 illustrates the exterior and interior proximity environments for a cell instance and some sub-cells;

FIG. 20B is a flow diagram illustrating the operation of the inventive distributed application.

DETAILED DESCRIPTION OF THE PREFERRED EMBODIMENTS

Hierarchical Representation

Figure 19A:
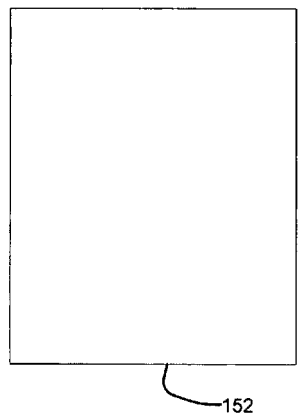
FIGS. 19A-D show the division of a reticle field into model zones and grids to account for positional effects.

A hierarchical representation of a chip layout design comprises primarily a collection of data objects or structures: a set of cell definitions (CellDef's).

FIG. 1 shows how the cell definitions may look in such a layout design.

Specifically, the cell definitions are data objects or data structures that describe recurring patterns within the layout design. Each cell definition CellDef1, CellDef2, . . . CellDef N 100 is typically characterized by a name for the cell 110. Further within the cell definition is typically a pointer 112 to the geometry information 114. This geometry information 114 may contain one or more (possibly a very large number of) geometric features (polygons, lines, holes, rectangles, paths, texts . . . , etc.). Such geometric features are called inline geometries of the CellDef. Within the CellDef, sub-cell pointers 116 are also commonly provided. These are pointers to nested sub-cells 118 that may contain further inline geometries, and/or pointers to even further sub-cells. CellDef's thus reference each other in a "nested/hierarchical" fashion, without creating a circular loop.

FIG. 2 illustrates the content of an exemplary cell definition data object 100 as encoded in a textual form.

Specifically, the cell definition contains a cell definition name "CellDef" 110. It further comprises the primitive polygon or shape information 114. The cell definition may further comprise structure references 118-S that are references to other sub-cells that are children cells to the present cell definition 100. Further, array references 118-A are provided to other cell definitions.

The full picture of a chip layout is embedded in a collection of cell instances S1 . . . S2 . . . Sn, as shown in FIG. 3. A cell instance (CellInst) is the incarnation, called an instantiation, of a CellDef. The process starts from the instantiation of the root-cell ROOT to create the Root Cell Instance (RootInst). Preferably this corresponds to the definition of the top-level view of the chip, or, as will be described below in the case of a reticle-wide hierarchy, it can correspond to the definition of the top-level view of the reticle (i.e., collection of chip images). Following the specification of the root-cell, a new cell instance is next created for each of the cell references occurring in the root-cell cell definition.

The instantiation process is recursively applied to the cell instances, until a cell instance is reached that contains only primitive geometric features P and no further cell references in its definition.

Such cell instances are commonly shown pictorially in the form of a tree, called a Hierarchy Tree, an example of which is illustrated in FIG. 3.

It is also possible for a layout design to contain multiple Root Cells. In that case, the multiple roots are just like trees in a forest. In such a situation, it is useful to create an overall chip-level root cell ChipRoot in which each of the multiple Root Cells is instantiated once.

Reticle Layout and Reticle Field-Wide Hierarchy

Referring to FIG. 4, a reticle 350 that is used in manufacturing an integrated circuit is shown. Such reticles typically contain multiple copies of a chip image. In this case, the chip image 352 is replicated (similar to an AREF of a CellDef within a chip layout) 9 times, in a regular 3×3 array.

However, the placement of the chip image 352 does not have to be regular in nature. The chip image may be placed at arbitrary locations across a reticle field, similar to an SREF of a CellDef across a chip layout.

Further even, a reticle may contain images of different chips. Such an example is illustrated in FIG. 5. Here the reticle contains 4 copies of a chip A, 4 copies of a chip B, 2 copies of a chip C, and 4 copies of another chip D. The chips are of varying sizes, and some of the placement configurations are not regular.

From a representational perspective, creating a field wide layout involves primarily adding a field-level root cell definition FieldRoot. In this FieldRoot there is one reference to a chip-level root cell ChipRoot for each placement of the corresponding chip image. The full extent of a field wide layout may also be looked at from a hierarchy tree perspective. If the reticle field contains images of different chip types, the resulting tree would look like that shown in FIG. 6A. In this case the sub-trees immediately below the FieldRoot are of different varieties. If the reticle contains images of just one chip type, these first level sub-trees would all be of the same kind, as illustrated in FIG. 6B.

Layout Templates

Given a hierarchical representation of a chip layout design and a reticle field layout in which one or more copies of the chip image is placed, various kinds of analysis and manipulation may be conducted using the representation to predict the behavior of the layout under various process conditions. An example is the lithographical patterning simulation, which takes a collection of layout features (polygons) and attempts to predict how the features may be imaged on the silicon surface, given certain process parameter values. Another example is the Optical Proximity/Process Corrections (OPC) application, which attempts to manipulate (modify) the layout features so that, when imaged on the silicon wafer, they more closely resemble the desired geometrical patterns.

In these applications, the behavior of or the modifications required for a specific geometric feature are not only a function of the feature itself, but are also highly dependent on those other features that happen to be situated in its surrounding or adjacent neighborhood. This neighborhood may theoretically extend indefinitely, but in practice there is a finite distance beyond which such influence is so small that its effect can reasonably be ignored in the analysis. Such influence is called the "proximity" effect and the finite distance is called the Range of Influence (ROI).

Generally, the ROI is a function of the parameters of the exposure system such as k (the wavelength) and NA (the numerical aperture). It also depends on such other factors as the degree of precision desired and the acceptable computational efforts. In one preferred embodiment, for a 193 nm stepper with an NA value of 0.75, the ROI is taken to be 0.6 micrometers (μm).

Thus, given an instance of a cell containing a collection of geometric features, in order to predict the behavior of these features, we need to know what other features are within a ring (or border) that is one ROI beyond the cell instance's boundary. These other features lying within the ROI ring are said to form the proximity "environment" or "neighborhood" of a particular cell instance. More precisely, the environment of a cell instance includes not only those geometric features from other cell instances that fall within the ROI ring of the subject instance, but also features from other cell instances overlapping with the extent of the subject instance. A cell instance's proximity environment is thus a function of where and how the instance is placed within its instantiating parent, and where and how that particular parent instance is placed, recursively all the way up to the root cell instance.

Given the proximity effects, the analysis or manipulation for different instances of a CellDef should not be conducted using just the information contained in the CellDef itself or one representative instance. Instead the proximity environment of each instance should also be taken into account in the operation. To facilitate that, the original CellDef and CellInst structures need to be expanded.

FIG. 7 illustrates an expanded cell definition that includes such proximity environment information, according to the principles of a preferred embodiment of the present invention.

Generally, for each CellDef, we need to look at all of its instances to see what and how many different proximity environments surround the instances. Each different proximity environment defines one environment extension (Env_n) 122. The CellDef structure is expanded to include a pointer 120 to a list of environment extensions 122. Each cell instance 108, in addition to pointing to its defining CellDef 100, also now needs to point to one of the environment extensions 122 that applies to the instance.

Thus, the set of instances of a CellDef is effectively further subgrouped based on the common proximity environments within the set. Those instances that share the same environment are grouped under one environment extension. Each unique environment extension 122 dictates one unique analysis or manipulation, and the results are applied to all instances sharing the same environment. While much emphasis will be given here to the environment being a function of proximity, in other embodiments of the invention, the environments will be further distinguished based upon position in the reticle field or functional considerations.

An instance 108 of a cell definition (CellDef) comprises a reference to the defining cell definition 100. In addition, each cell instance data structure further comprises some location, orientation, transformation information, and an instance Id, as provided by LocOmt/Id 124. It also provides a reference to the parent instance 126 and points to the next sibling instance 128 under the same parent, and a pointer 130 to the first of its own children.

Referring to FIG. 8, the cell definition CellDef object 100, including a unique proximity environment extension 122, and all cell instances 108 having (or pointing to) the same environment extension 122, is called a Template 150. The cell definition CellDef 100 object, a unique environment extension 122, and one cell instance 108 is referred to as a Template Instance or a LithoCell 151.

The creation of these templates enables instances of a cell definition to be categorized by their proximity environments.

Specifically, an instance is grouped with other instances having the same environment. Thus, the resulting templates can be used as a basis for various layout manipulation applications such as OPC modifications. Furthermore, the templates 150 can be used to form job units for distributed processing and may also serve as a unit for other optimizations.

Determining Proximity Environments of Cell Instances

FIG. 9 shows a simple layout to illustrate how instances of a CellDef may have different proximity environments and the complications involved in determining such environments.

Shown there is a top level view 152 of the layout that is comprised of a plurality of inline geometric features 154 and five sub-cell instances: two instances of a cell named Cell A (one of the instances is rotated 90° clockwise), two instances of a cell named Cell B (one of the instances is rotated), and one instance of a cell named Cell C.

FIG. 10 shows the detailed composition of two of the three first level cell instances. Thus Cell A is further comprised of sub-cells D, E, and F; cell C is comprised of sub-cells K and J. Going yet another level deeper, it shows that cell D is further comprised of sub-cells G and H, and cell K is comprised of sub-cells P, R, and Q.

FIG. 11 illustrates a zoomed-in view of this example layout by bringing out the detailed compositions of the two lower instances of Cell A and Cell C. As shown here, an instance of Cell H and an instance of Cell R are neighbors of each other.

Viewing the layout from a hierarchy tree perspective, FIG. 12 shows a partially expanded tree of the cell instance hierarchy. As can be seen, the two adjoining instances of Cell H and Cell R shown in FIG. 11 are situated in branches that are very far apart from each other in the tree structure. The key point to notice is, geometric features going into the proximity environment of a cell instance may come practically from other cell instances situated anywhere in the hierarchy tree.

Strictly speaking, the proximity environment of a cell instance is defined by the actual geometric features that fall within the ROI ring of its outer boundary. This essentially means that one way to compare proximity environments would be to fully "flatten" or expand the whole hierarchy, leading to very large data volume and long computations. However, according to a preferred embodiment of the invention, several optimizing preprocessing steps are performed, as illustrated in FIG. 13, before templates are generated.

Not all cell definitions are suitable as a candidate for a template. For example, it is generally preferable for a template to be of a certain minimum size. A very small CellDef is likely to generate a very large collection of different proximity environments, which is undesirable. (One exception to this rule, however, is the Unit Cell in an Array Reference, such as the bit cell in a memory array.)

Thus, after receiving the layout design data in step 1010, the next preprocessing step is to divide the set of CellDef's into two groups: those that are template candidates (TC) and those that are not template candidates (NTC) in step 1020. The contents of an NTC cell will be flattened and processed as a part of whichever CellDef that references it. One simple criterion may be just by the cell size. Other more sophisticated criteria are also possible.

Among the TC cell definitions, cells that contain only primitive geometries (inline geometric features) or references to NTC CellDef's (i.e., no reference to other TC CellDef) are identified in step 1030.

Then in step 1040, all geometries in non template candidate cells are flattened and brought to the level of the TC CellDef's.

The raw geometric features are the objects in a layout manipulation operation. For each TC CellDef these features come from two sources: they are a part of the CellDef's inline geometries, or they are the result of flattening of any NTC cells referenced in the current CellDef.

These are the geometries, called Primary Geometries (PGeo's), which need to be operated on as far as the current template is concerned. All other geometries are contained in their respective templates and are to be handled within those templates, and because of the nested nature of the template structure, every polygon will be ultimately accounted for.

To facilitate the generation and the determination of the identity of proximity environments, we next cluster or tile the primary geometries (PGeo's) into some small units called primitive unit cells (PUC's) in step 1050. In one preferred embodiment, each PUC is designed to be square and of a size roughly equal to the ROI. For the purpose of this disclosure, "roughly equal to" means between about 1.0 times and about 2.0 times the ROI, more preferably between about 1.0 times and 1.5 times the ROI, and most preferably about 1.2*ROI.

In a preferred embodiment, the PUC's contain primary geometry information, i.e., polygon descriptions. In other embodiments, the PUC's contain polygon information by reference, such as to other cells, in addition to possibly primary geometry information.

For each TC cell definition, a bounding box is generated in step 1060. This bounding box will be used to approximate the proximity environments for instances of the CellDef.

Then, in step 1070, for each PUC a unique identifier is assigned. This identifier, usually a numerical ID, is used to determine the identity of the environments of different instances of a CellDef. For each PUC a bounding square is also generated.

In an alternative embodiment, the PUC's are defined by dividing each TC CellDef into a regular grid. Grid cells that contain no geometric features can be safely ignored. Each PUC in the grid is preferably sized based on the ROI. In one preferred embodiment, each cell of the grid is a square having dimensions of 120% of the ROI, although as mentioned in connection with the embodiment using clusters of PGeo's, the grid dimensions can be as little as 100% or as much as 200% of the ROI. Each cell is then given a unique PUC identifier.

FIG. 14A illustrates the CellDef 100 structure with the addition of the PUC information.

Each CellDef 100 now contains a pointer 160 to a list of primitive unit cells (PUC's) 162 that together contain all the primary geometries (PGeo's) of the CellDef. Each PUC 162 contains information about its bounding square and is assigned a sortable unique ID.

As originally defined, the proximity environment of a cell instance is determined by the actual raw geometric features from other cell instances that overlap the ROI ring surrounding the given instance. With the creation of the PUC's 162, we no longer have to deal with the actual geometries. Instead, each proximity environment is effectively defined by the list of PUC's (from other cell instances) that comprise the environment. The task of determining whether two cell instances of one CellDef have the same proximity environment now becomes the much easier (less computationally intensive) task of comparing two lists of PUC identities (plus the transformation information) to see if they are identical.

Generating the Templates

The main task remaining to complete the template generation is to traverse the cell instance tree to determine what different environments the instances of a CellDef are surrounded with and, for each cell instance, which environment extension 122 matches the particular instance's proximity environment. The cell instance structure as shown in FIG. 7 will now point to a specific environment extension 122.

FIG. 14B illustrates the revised cell definition in which each proximity environment is defined using the PUC information. Each unique environment includes a pointer 164 to a sorted list 166 of PUC Id's, along with some transformation information pertaining to each PUC.

One tradeoff in using the PUC ID and the transformation information, instead of meticulously comparing each polygon in the ROI of each instance of a CellDef, is that we gain in identification speed, but may potentially lose slightly in terms of reuse. For example, we may disadvantageously conclude that two instances of a CellDef have different proximity environments while in reality, if we were to actually examine/compare the primitive geometric features that fall within their respective ROI surroundings, the environments could be identical. The chance of such an occurrence is deemed small, however. And even if it were to happen, the results would still be correct.

As defined, for each cell definition CellDef the operation of generating or creating templates serves mainly to partition all of the instances of that CellDef into a number of disjoint sub-groups, each pertaining to a unique, distinct proximity environment. Each template serves as a standalone, independent sub-unit. Given that instances in the said sub-unit all have identical proximity environment, operations performed using one of them thus can be shared by all other instances in that unit, thereby achieving the savings in computational effort.

Furthermore, if for a given CellDef the process of template generation results in the identification of N distinct proximity environments among all of the instances of the said CellDef, and the creation of N templates (i.e., the cell instances are partitioned into N disjoint sub-groups), presumably these N sub-groups would also result in different outcomes in a subsequent layout manipulation processing such as an OPC application or other layout optimization application. To facilitate such subsequent processing, N new CellDef's will be created as a result of the template generation process. Thus instead of having instances of the given CellDef all pointing to the same original CellDef, each instance will now point to a new CellDef corresponding to the particular proximity environment that matches with the said instance, i.e., corresponding to the particular template of which the said instance is a part.

FIG. 15 illustrates a hierarchical tree view of a layout corresponding to the one shown in FIG. 3 after the template generation process. The tree is substantially the same as the one shown previously except for the fact that the various cell instances now point to some new cell definitions that were created in the process of template generation. In this example there are three instances of a CellDef called SI: two instances at level 1 and one instance at level 2. Let us assume that as we go through the process of determining the unique proximity environments and generating the templates for the layout, we come to the conclusion that the two level 1 instances share the same proximity environment while the instance at level 2 has its own, distinct $2^{nd}$ environment. In that case, two templates will be created for CellDef SI, one encompassing the two level 1 instances and the other encompassing the single level 2 instance. In the process two new cell definitions will be created, designated S1a and S1b, with the cell instances pointing to their respective corresponding new cell definitions. This reformulated hierarchy tree is called the Litho Hierarchy Tree for the layout.

FIG. 16 illustrates the cell definition data structure after the creation of such new cell definitions. Specifically, for each original cell definition CellDef 100, a number of new cellDefs 100', designated CellDef/1, CellDef/2, CellDef/3, . . . , are created, each corresponding to a template or one distinct proximity environment.

FIG. 17 illustrates the cell definition data structure and the associated templates, including the modified geometries after some layout manipulation application. Specifically, for each unique environment, a pointer 168 is added that refers to the modified geometries 170 that are generated from an application such as OPC or other layout optimizations. The computation only needs to be performed once for instances 108 within a given template, and the results will be shared by all instances of that template.

Exterior/Interior Proximity Environments

Templates as defined so far consider only proximity environments and are defined in a nested/recursive fashion. Any TC sub-cells referenced in a TC CellDef are defined as templates themselves and are to be processed as such. Thus when we talk about processing one template (one CellDef), we are actually processing only the inline polygons and those polygons in any NTC sub-cells that are "flattened" to the current CellDef level (i.e. the Primary Geometries—PGeo's).

FIG. 18 shows two additional groups of polygons that also need to be taken into account while processing the primary geometries of the current template. The first group contains the shapes in the outward proximity neighborhood that fall within the ROI region 330 of an instance 108 as discussed above. This is called the Exterior Proximity Environment 330.

On the other hand, looking inwards, the polygons in a ring on the edge of each TC sub-cell 332 also have an effect on the processing of PGeo's of the current cell instance. This is called the Interior Proximity Environment 334. By definition, a CellDef that results in multiple templates has multiple Exterior Proximity Environments. On the other hand, there is actually only one Interior Proximity Environment which is the same among all Templates resulting from a given CellDef. Polygons contained in both Exterior and Interior Proximity Environments are called Secondary Geometries.

Positional (Within Chip and Across Field) and Functional Effects

In OPC applications, how a polygon needs to be modified in order to print faithfully depends not only on the polygon itself, but also on other polygons in its surrounding region. This is the proximity effect as explained previously. Accordingly, OPC pre-distorts the layout features, taking into account polygons in the proximity of each geometric feature. Such proximity effect is invariant as the chip image is replicated multiple times across a reticle field. Thus, referring to the reticle layout example shown in FIG. 4, the nine instances of the cell A across the reticle field all have the same proximity environment.

However, the behavior of a geometric feature depends not only on the feature itself and its neighboring shapes, but also on its exact position or location in the layout, both within the extent of one chip image as well as across different images when looked at from a reticle-wide perspective. This dependency on the feature's location in the imaging field is due to factors such as lens aberrations, optical flare, and illumination pupil non-uniformity. These factors have small but perceptible variations across the imaging field, and affect the polygon's printing behavior. These influences are called the Positional Effects.

Thus, given a collection of cell instances 108 of a CellDef having the same proximity environment, the computations and accordingly the end results may have to be different for different instances because of the positional effects. In the extreme, each instance may have to be treated individually; no sharing of computational efforts or output representations is feasible. On the other hand, for some applications (e.g., OPC), the positional effects represent only small perturbations over the proximity effects, such that treating the instances all separately may not be necessary.

Figure 19B:
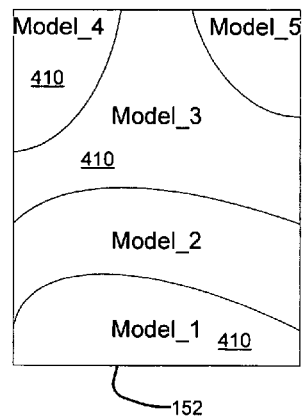
Figure 19C:
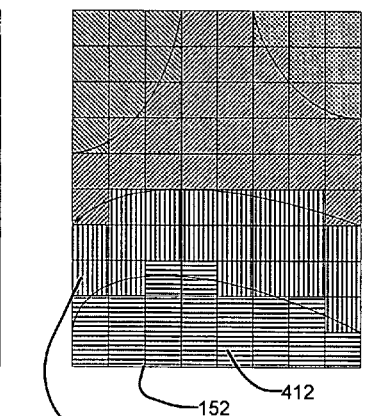
Figure 19D:
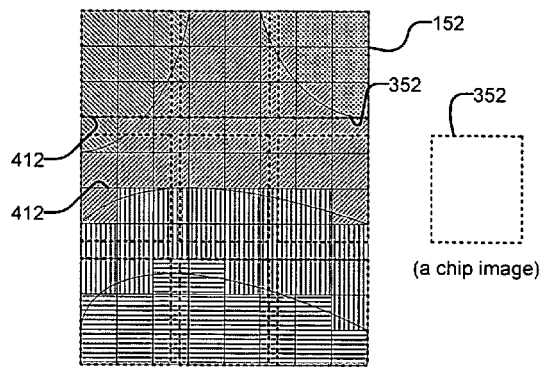

FIGS. 19A-D illustrate how the positional effect is accounted for in one preferred embodiment of the present invention. Here the reticle field 152 (shown in FIG. 19A) is divided into a (relatively) small number of zones 410, as shown in FIG. 19B. Each zone 410 has an associated "model ID" and designates a region of the field within which the positional effects (aberrations, flares, . . . , etc) are presumed to be substantially identical. Notice that it is permissible for disjoint zones to have the same model ID. Furthermore, the reticle field is sub-divided into some small grids defined as rectangles or squares 412, which are smaller than the zones. This is shown in FIG. 19C. Given two instances of a CellDef, these model ID's can be used to determine if they have the same "positional" environment, similar to how the PUC's are used to distinguish proximity environments. This allows us to partition instances of a CellDef according to their positional environments within the chip images 352 that are overlayed on model grid 412 and across the reticle field 152, as shown in FIG. 19D.

In addition to the proximity and positional effects that would render the otherwise identical instances of a given CellDef different, necessitating different treatments of sub-groups of instances when performing various layout analysis or manipulation operations, sometimes operational or functional considerations may also make it necessary to treat certain instance or instances of the CellDef differently in order to better meet a certain performance target. For example, a given CellDef may have many instances throughout the chip. Some of those instances may form part of a critical signal net such that more sophisticated analysis algorithms or aggressively optimized OPC modifications are called for. Like the proximity effects, such functional effects similarly lead to further partitioning or sub-grouping of instances of the CellDef so that different sub-groups may be treated differently.

Another way of articulating concerns regarding functional considerations is in terms of feature tolerances. Often on critical paths, tolerances are tightened to improve yield, since greater control over feature variability is required to ensure proper operation. Thus, controlling feature tolerances and variation over the field can be addressed using techniques described in U.S. patent application Ser. No. 10/955,527, filed Sep. 30, 2004, assigned to the same assignee as the current invention, entitled Method and System for Managing Design Corrections for Optical and Process Effects Based on Feature Tolerances, by Vishnu Govind Kamat, which is incorporated herein by this reference in its entirety.

Extended Definition of an Exterior Environment and Reticle-Wide Templates

Given a CellDef and all of its instances within the chip and across the reticle field, the notion of a proximity environment allows us to partition the instances into sub-groups, each containing a subset of the instances having an identical proximity environment. Each such a sub-group leads to the definition of a template. Looking at the notion of an environment as a "differentiator" among the instances of the cell definition, an extended notion of an Exterior Environment can be defined that takes into account at least the following various types of effects: 1) the proximity effects; 2) the positional effects; 3) the functional/operational effects.

Depending on factors such as the accuracy desired, the amount of computation time to be spent, the size of the resulting data, one or more of these effect categories may be used to define the exterior environments, which are then used in turn to partition instances of a CellDef to form templates. All cell instances within one template can be considered to be identical in all respects, such that they may share the same representation and computation.

Templates thus generated have a scope extending across the entire reticle field. Referring to FIG. 4, copies of the cell instance Inst_A 108 in different chip images 352 all have an identical proximity environment. They differ only as a result of positional and/or functional effects. Thus, the notion of templates is extended to cover the reticle-wide operation, with templates extending across the reticle field and between different chip images or chip instantiations. In effect, templates are defined, leading to a Litho Hierarchy Tree at the field level in accordance with the placement information for those chip images. The resulting templates thus take into account variations due to proximity, positional and/or functional effects resulting from the locations of all chip placements in the whole reticle field.

Using Interpolation

Instead of applying the positional environment to the full extent as a differentiator to partition instances of a CellDef into templates to account for positional effects, some of the instant inventors have proposed to determine the proximity and positional perturbation corrections for a set number of, usually a few, instances of a CellDef across a number of positions in a field. Then, requisite corrections are derived for other instances in the field by interpolating the results from the corrections calculated for those representative instances. This can be achieved by applying position dependent corrections to a few widely separated instances of a CellDef, and interpolating the corrections to other instances of the CellDef as a function of field position $(x_f, y_f)$. This is described in U.S. patent application Ser. No. 10/933,192 filed on Sep. 1, 2004, assigned to the same assignee as the current invention, entitled "Method for Correcting Position-Dependent Distortions in Patterning of Integrated Circuits," which is incorporated herein in its entirety by this reference.

Computation Distribution and Reuse

Templates 150 provide a convenient way of dividing the task of analyzing or manipulating a hierarchically structured chip and the corresponding reticle-wide layout into sub-tasks for distributed processing. In one preferred embodiment the distribution is done on a per template basis.

Figure 20A:
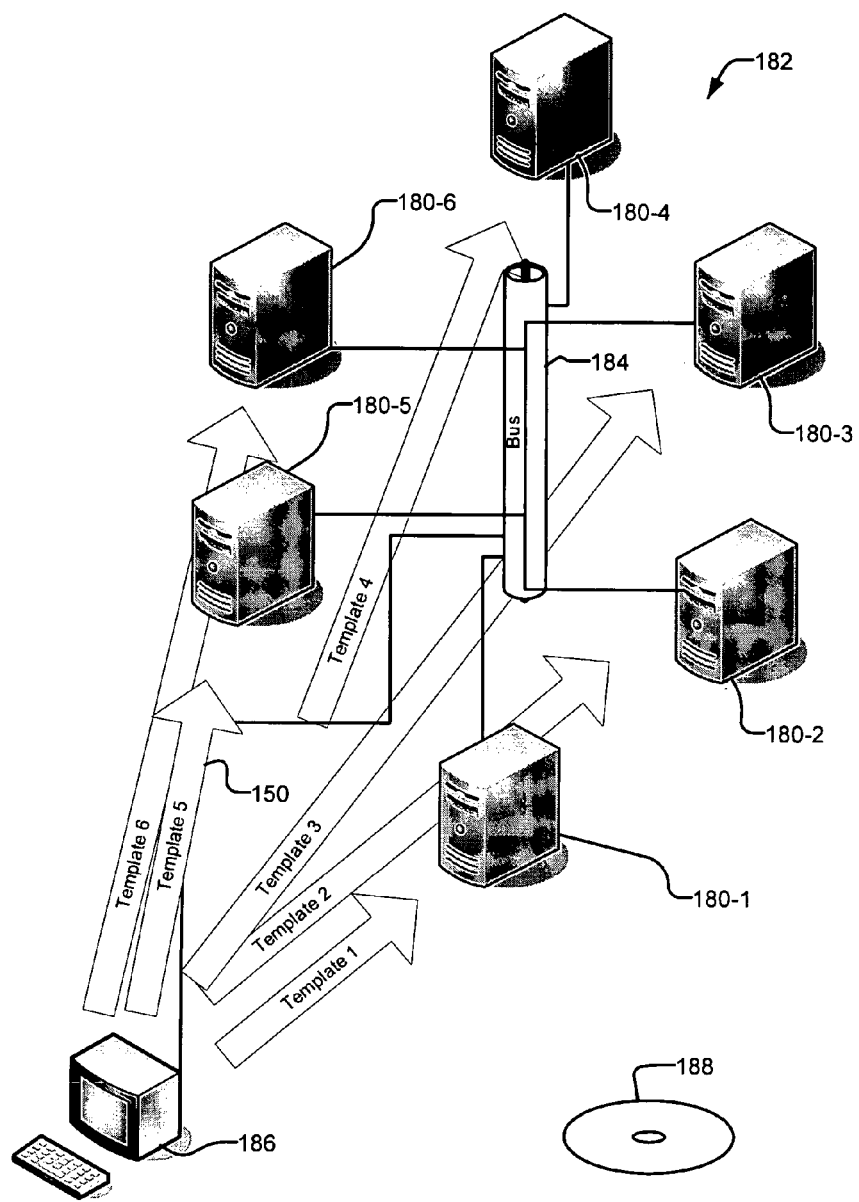
FIG. 20A illustrates the distribution of the templates to computational nodes for concurrent execution according to an aspect of the present invention.

FIG. 20A illustrates the distribution of the templates template 1, template 2, . . . template n (150) to different nodes 180-1 to 180-6 of a distributed computing system 182.

The main objective here is to divide the overall layout manipulation task into a set of sub-tasks so that they can be distributed across a collection or cluster 182 of computational nodes 180 on a network 184, thereby reducing the total turn-around time. The template structure provides a natural framework for job partition.

In the illustrated example, the nodes 180 form a cluster that is interconnected via a high speed backplane or bus 184. A cluster controller or master 186 handles the distribution so that each node 180 receives a standalone, independent task. The programming instructions are stored in a computer readable medium such as a hard drive of the master 186, or possibly a removable disk 188, which is loaded into the master 186 and/or nodes 180.

FIG. 20B is a flow diagram illustrating the process for the distributed computational task.

To affect distributed processing and load balancing among nodes 180, a metric is first defined to quantify the amount of computations needed for each template 150 in step 210. A simple way of doing this is by measuring the size/area of or by counting the number of polygons/vertices contained in the CellDef for the templates.

In step 212, the jobs are dispatched and then monitored by the master 186. Each node then runs the intended layout analyzer/manipulator 214 to create the modified geometry of the lithography data. The analyzer processes then return results in step 216.

The distribution may be done either statically or dynamically by the master 186. In the former, the jobs are statically allocated to a collection of computational nodes, based on the computational needs of the templates and the processor nodes available. In the latter case the allocation is done dynamically, controlled by a monitoring program which keeps track of the initiation and completion of the jobs and tries to balance the load among all the computational nodes.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of reticle field-wide hierarchy management, comprising:
   providing placement information of a hierarchical chip layout across a reticle field;
   generating templates and building a litho hierarchy tree for an entire reticle field in accordance with the placement information, the templates accounting for variation due to one or more of: positional environment within the reticle field, proximity environment, and structural functionality requirements;
   determining an exterior environment for each instance of a template candidate cell definition;
   generating a set of distinct environments for the exterior environments resulting from instances of the template candidate cell definition; and
   partitioning instances of the template candidate cell definition to a corresponding one of the distinct environments to create one or more templates, in accordance with the respective exterior environments of the template candidate cells.

2. The method as claimed in claim 1, wherein the step of providing placement information comprises providing locations for instances of the chip layout as array references across the reticle field.

3. The method as claimed in claim 1, wherein the step of providing placement information comprises providing coordinates for instances of the chip layout across the reticle field to thereby enable arbitrary placement of the instances in the reticle field.

4. The method as claimed in claim 1, further comprising defining a reticle field-level cell encompassing at least one chip-level cell corresponding to the chip layout.

5. The method as claimed in claim 1, further comprising the step of defining primitive unit cells in the chip layout.

6. The method as claimed in claim 1, wherein the step of generating the templates in accordance with the placement information comprises generating the templates by assigning instances to distinct environments, wherein the environments are distinguished by cells in regions adjacent to each of the instances.

7. The method as claimed in claim 1, wherein the step of generating the templates in accordance with the placement information comprises generating the templates by assigning instances to different functional requirements pertaining to each of the instances.

8. The method as claimed in claim 1, wherein the step of generating the templates in accordance with the placement information comprises generating the templates by assigning instances to distinct environments, wherein the environments are distinguished by positional environment pertaining to each of the instances.

9. The method as claimed in claim 8, wherein the positional environment arises from at least one of lens aberration, optical flare, and/or pupil illumination non-uniformity.

10. The method as claimed in claim 1, wherein the, step of generating the templates in accordance with the placement information comprises:
    first grouping instances subject to common proximity perturbation effects; and
    then further grouping the instances to address positional perturbation effects.

11. The method as claimed in claim 10, wherein the positional perturbation effects include at least one of lens aberration, optical flare, and/or pupil illumination non-uniformity.

12. The method as claimed in claim 1, further comprising distributing a computational task for an integrated circuit layout design on a reticle field wide basis among a collection of networked computation nodes, by carrying out the steps of:
    assigning the computation tasks for the templates to the networked computation nodes for concurrent execution; and
    assembling outputs from the computation nodes.

13. An integrated circuit manufactured according to the method of claim 12.

14. The method as claimed in claim 12, wherein the step of assembling outputs comprises creating a final processed circuit layout for the entire reticle field.

15. The method as claimed in claim 12, wherein the computational tasks are independent subtasks.

16. An integrated circuit manufactured according to the method of claim 1.

17. A method of reticle field-wide hierarchy management in an integrated circuit chip layout design, the method comprising the steps of:
    receiving a chip layout in hierarchical form;
    receiving placement information for the chip layout across a reticle field; and generating templates and building a litho hierarchy tree for an entire reticle field in accordance with the placement information; wherein the step of generating the templates and building the litho hierarchy tree comprises:
       for each instance of a template candidate cell definition, determining an exterior environment;
       for the exterior environments resulting from instances of the template candidate cell definition, generating a set of distinct environments; and
       partitioning instances of the template candidate cell definition to a corresponding one of the distinct environments to create one or more templates, in accordance with the respective exterior enviromnents of the template candidate cells.

18. The method as claimed in claim 17, wherein the step of generating templates and building the litho hierarchy tree further comprises preprocessing steps of:
    identifying primary geometries of template candidate cells;

generating primitive unit cells (PUC's) from the primary geometries of the template candidate cells; and assigning a unique identifier to each of the primitive unit cells.

19. The method as claimed in claim 17, wherein the step of determining the exterior environment for an instance comprises determining the said instance's proximity environment.

20. The method as claimed in claim 17, wherein the step of determining the exterior environment for an instance comprises determining the said instance's functional environment.

21. The method as claimed in claim 17, wherein the step of determining the exterior environment for an instance comprises determining the said instance's positional environment.

22. An integrated circuit manufactured according to the method of claim 17.

23. A method of partitioning a plurality of instances of a template candidate cell in a hierarchical chip layout design, the method comprising:

identifying adjacent regions for each of the instances of the template candidate cell;

generating an exterior environment for each of the instances of the template candidate cell, said exterior environment comprising one or more primitive unit cells (PUC's) overlapping or in contact with the adjacent regions of each of the instances;

generating a set of unique environments for the exterior environments resulting from instances of template candidate cell definition; and assigning the instances of the template candidate cell to corresponding ones of the unique environments based on the PUC's.

24. The method as claimed in claim 23, wherein the adjacent regions correspond to regions within a range of influence for the instances.

25. The method as claimed in claim 24, wherein the range of influence is about 0.61.1 m.

26. The method as claimed in claim 23, wherein PUC identifiers are used to represent the primitive unit cells.

27. The method as claimed in claim 23, wherein the step of determining the set of unique environments comprises comparing identities and transforms for the PUC's.

28. The method as claimed in claim 23, further comprising defining templates for the instances based on the unique environments.

29. The method as claimed in claim 28, further comprising applying corrections for geometrical features within the templates.

30. The method as claimed in claim 29, wherein the corrections for geometrical features within the templates are computed by distributing respective templates for computation to respective ones of a collection of networked computation nodes.

31. The method as claimed in claim 30, wherein the computation nodes perform the intended computations for the templates concurrently.

32. The method as claimed in claim 30, wherein the computation nodes perform the intended computations for the templates on a reticle-wide basis.

33. The method as claimed in claim 28, further comprising determining optical proximity corrections for the templates.

34. The method as claimed in claim 28, further comprising determining corrections for the templates to address positional perturbations.

35. The method as claimed in claim 28, further comprising determining corrections for the templates to address functional requirements.

36. An integrated circuit manufactured according to the method of claim 23.

37. A computer program product comprising a computer useable medium having a computer readable program code functions embedded in the medium for causing a computer to manage for reticle field-wide hierarchy management in an integrated circuit chip layout design, the product comprising a computer-readable medium in which program instructions are stored, which instructions, when read by a computer, cause the computer to:

receive the chip layout in hierarchical form;

receive the placement information for the chip layout across the reticle field; and generating templates and building a litho hierarchy tree for an entire reticle filed in accordance with placement information, wherein said generating comprises:

for each instance of a template candidate cell definition of the chip layout, determine an exterior environment;

for the exterior environments resulting from instances of the template candidate cell definition, generate a set of unique distinct environments;

partition the collection of instances of the template candidate cell definition to create one or more templates in accordance with their respective exterior environments; and generate the templates.

38. The product as claimed in claim 37, further comprising a third computer readable program code that causes the computer to determine if particular cell definitions are suitable candidates as templates.

39. The product as claimed in claim 37, further comprising fourth third computer readable program code that causes the computer to determine a proximity environment for each instance.

40. The product as claimed in claim 37, further comprising a fourth computer readable program code that causes the computer to determine a functional environment for each instance.

41. The product as claimed in claim 37 further comprising a fourth computer readable program code that causes the computer to determine a positional environment for each instance.

42. An integrated circuit manufactured with the computer program product of claim 37.

43. A computer program product for partitioning a plurality of instances of a template candidate cell in a hierarchical chip layout design the computer program product having a computer readable program instructions embedded in the medium for causing a computer to:

identify adjacent regions for each of the instances of the template candidate cell;

generate an exterior environment for each of the instances of the template candidate cell, said exterior environment comprising one or more primitive unit cells (PUC's) overlapping or in contact with the adjacent regions of each of the instances;

generating a set of unique environments for the exterior environments resulting from instances of the template candidate cell definition; and assign the instances of the template candidate cell to corresponding ones of the unique environments based on the primitive unit cells.

44. The product as claimed in claim 43, wherein the adjacent regions correspond to regions within a range of influence for the instances.

45. The product as claimed in claim 43, wherein the instructions further cause the computer to compare identities and transforms for the PUC's.

46. The product as claimed in claim 43, wherein the instructions further cause the computer to define templates for the instances from unique environments.

47. The product as claimed in claim 46, wherein the instructions further cause the computer to distribute the templates among a collection of networked computation nodes.

48. The product as claimed in claim 47, wherein nodes are separate workstations.

49. The product as claimed in claim 47, wherein the instructions further cause the computer to perform intended computations for the templates.

50. The product as claimed in claim 47, wherein the instructions further cause the computer to perform the intended computations for the templates concurrently.

51. The product as claimed in claim 46, wherein the instructions further cause the computer to perform intended computations for the templates.

52. The product as claimed in claim 46, wherein the instructions further cause the computer to perform optical proximity corrections for the templates.

53. The product as claimed in claim 46, wherein the instructions further cause the computer to perform corrections for the templates to address positional perturbations.

54. The product as claimed in claim 46, wherein the instructions further cause the computer to perform corrections for the templates to address functional requirements.

55. An integrated circuit manufactured with the computer program product of claim 43.

56. A computer program product for distributing computational tasks for an integrated circuit layout design on a reticle field wide basis among a collection of networked computation nodes, the computer program product having a computer readable program instructions embedded in the medium for causing a computer to:
  generate a plurality of templates and building a litho hierarchy tree for an entire reticle field in accordance with a placement information of the integrated circuit layout across the reticle field;
  assign the computation tasks for the templates to the networked computation nodes for concurrent execution; and
  assemble outputs from the computation nodes, wherein generating the templates and building the litho hierarchy tree comprises:
    for each instance of a template candidate cell definition, determining an exterior environment;
    for the exterior environments resulting from instances of the template candidate cell definition, generating a set of distinct environments; and
    partitioning instances of the template candidate cell definition to a corresponding one of the distinct enviromnents to create one or more templates, in accordance with the respective exterior environments of the template candidate cells.

57. The product as claimed in claim 56, wherein the computational tasks are independent subtasks.

58. The product as claimed in claim 56, wherein the instructions further cause the computer to create a final processed circuit layout for the entire reticle field.

* * * * *